United States Patent [19]

Cortjens et al.

[11] Patent Number: 5,589,878
[45] Date of Patent: Dec. 31, 1996

[54] METHOD OF DETERMINING AN ERROR IN A VIDEO CONFERENCING SYSTEM CAMERA

[75] Inventors: Leo M. Cortjens, Norcross; Kenneth A. Franklin, Lawrenceville; Richard C. Mays, Atlanta; Curtis M. Smith, Lawrenceville, all of Ga.

[73] Assignee: Videoconferencing Systems, Inc., Norcross, Ga.

[21] Appl. No.: 373,412

[22] Filed: Jan. 17, 1995

Related U.S. Application Data

[62] Division of Ser. No. 139,645, Oct. 20, 1993, abandoned.

[51] Int. Cl.⁶ .................................................. H04N 5/232
[52] U.S. Cl. ............................. 348/211; 348/15; 348/734
[58] Field of Search ...................... 348/734, 13, 14–19, 348/211–214; 358/210, 194.1; H04N 7/14, 7/15, 5/232

[56] References Cited

U.S. PATENT DOCUMENTS

| 5,218,627 | 6/1993 | Carey et al. | 348/211 |
| 5,230,059 | 7/1993 | Nielsen et al. | 348/161 |

FOREIGN PATENT DOCUMENTS

| 0539695 | 5/1993 | European Pat. Off. | H04N 7/14 |
| 2846664 | 5/1979 | Germany. | |
| 0247184 | 11/1986 | Japan | 348/734 |
| 0109879 | 5/1991 | Japan | H04N 5/232 |
| 0207451 | 8/1993 | Japan. | |
| 0207453 | 8/1993 | Japan. | |
| 0207458 | 8/1993 | Japan. | |
| 0021211 | 11/1992 | WIPO. | |

*Primary Examiner*—David E. Harvey
*Attorney, Agent, or Firm*—Jones & Askew

[57] ABSTRACT

A videoconferencing system including error detection, monitoring, and reporting. A controller (10) controls the operation of a camera (17) or a peripheral device, such as a video cassette recorder (20), or a modem (22). A user input device, such as a mouse (12) or a joystick (18), is connected to the controller to allow the user to control the camera or the peripheral device via the controller. The controller sends the user's commands and then monitors status signals to determine whether the commands were properly executed or errors occurred. The controller stores indications of the errors and the command signals associated with the errors and automatically provides notice of the errors associated with the operation of the camera and the peripheral devices. The controller also provides notice of any errors to remote locations via the modem. The user may print out a report listing the errors and the command signals associated with the errors. The controller also identifies a command associated with an error and provides the reverse command in an attempt to correct the error.

27 Claims, 14 Drawing Sheets

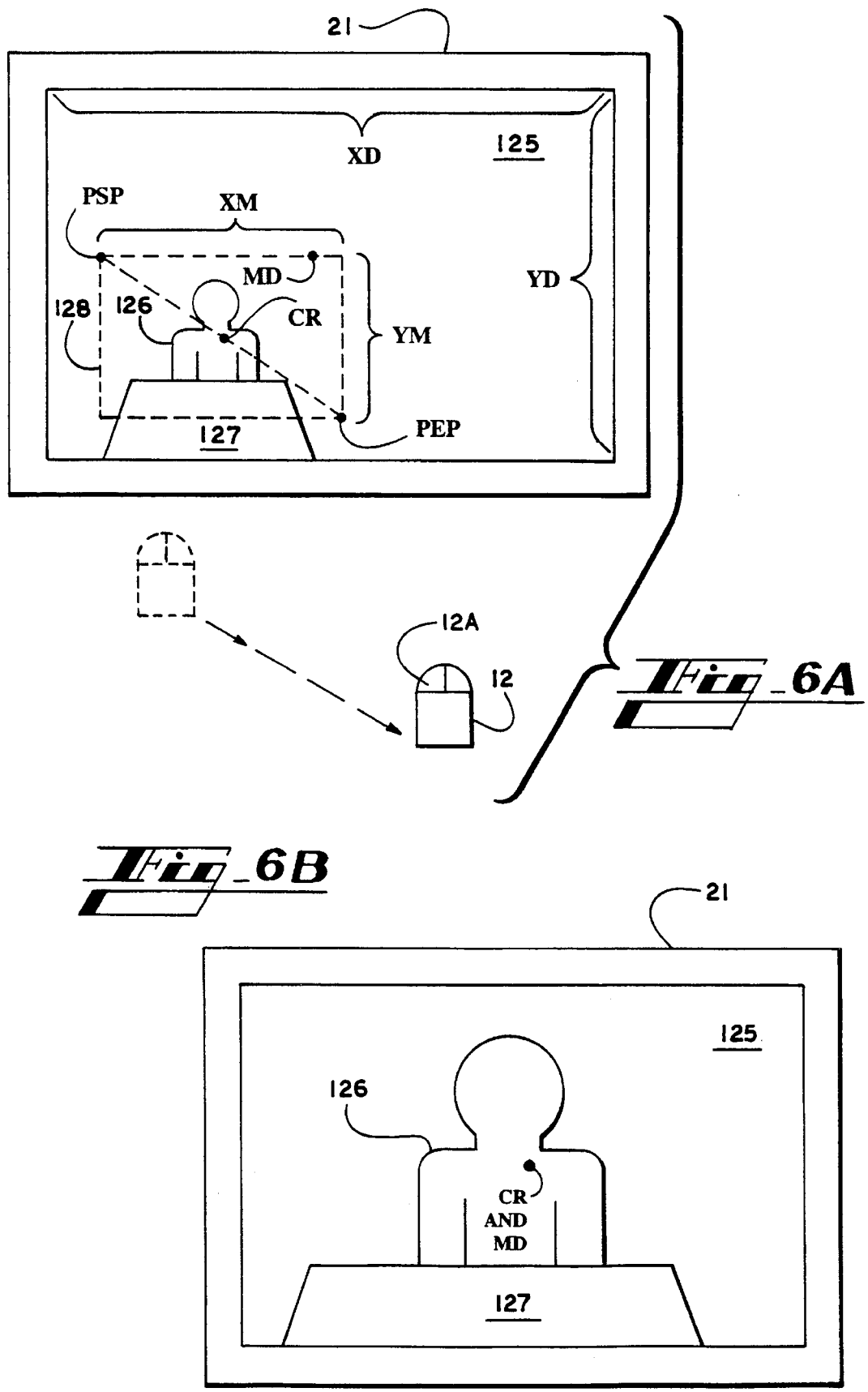

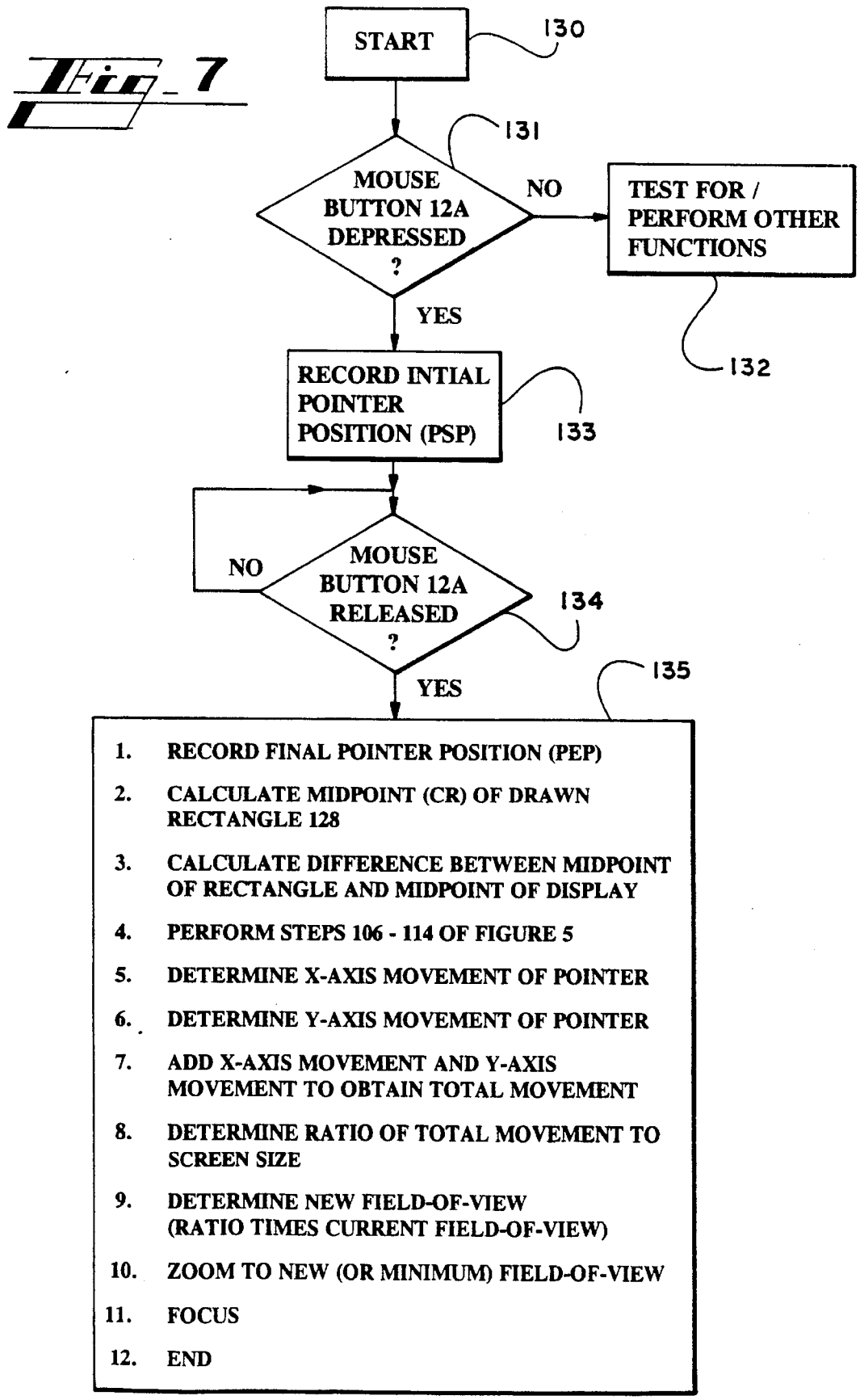
Fig_7

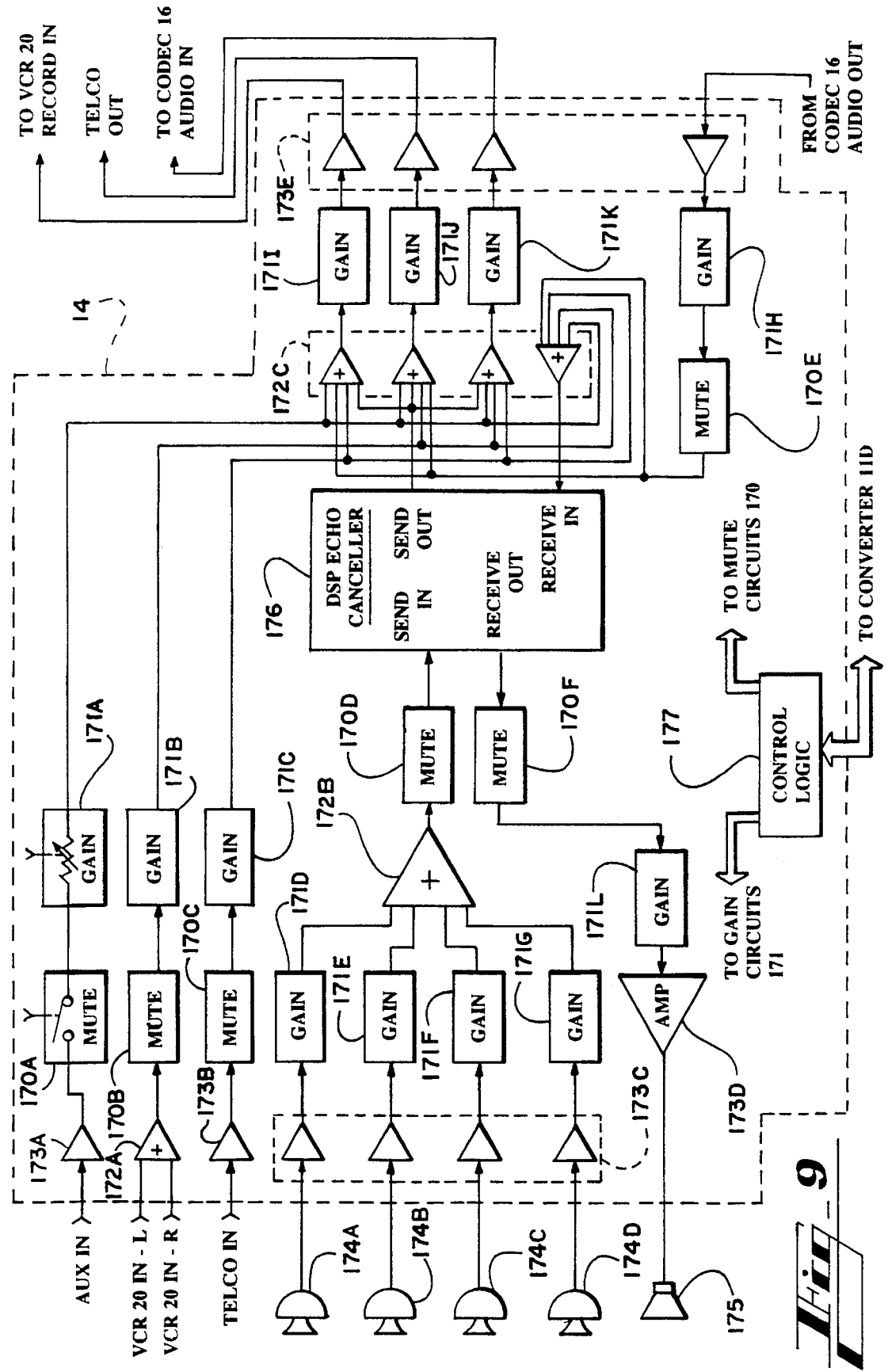

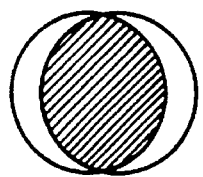
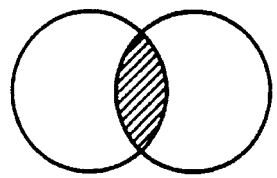
MATCHING REGIONS
NON-MATCHING REGIONS
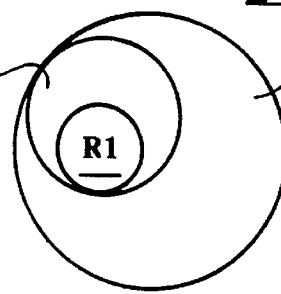
PARENT OF R1
PARENT OF PARENT OF R1
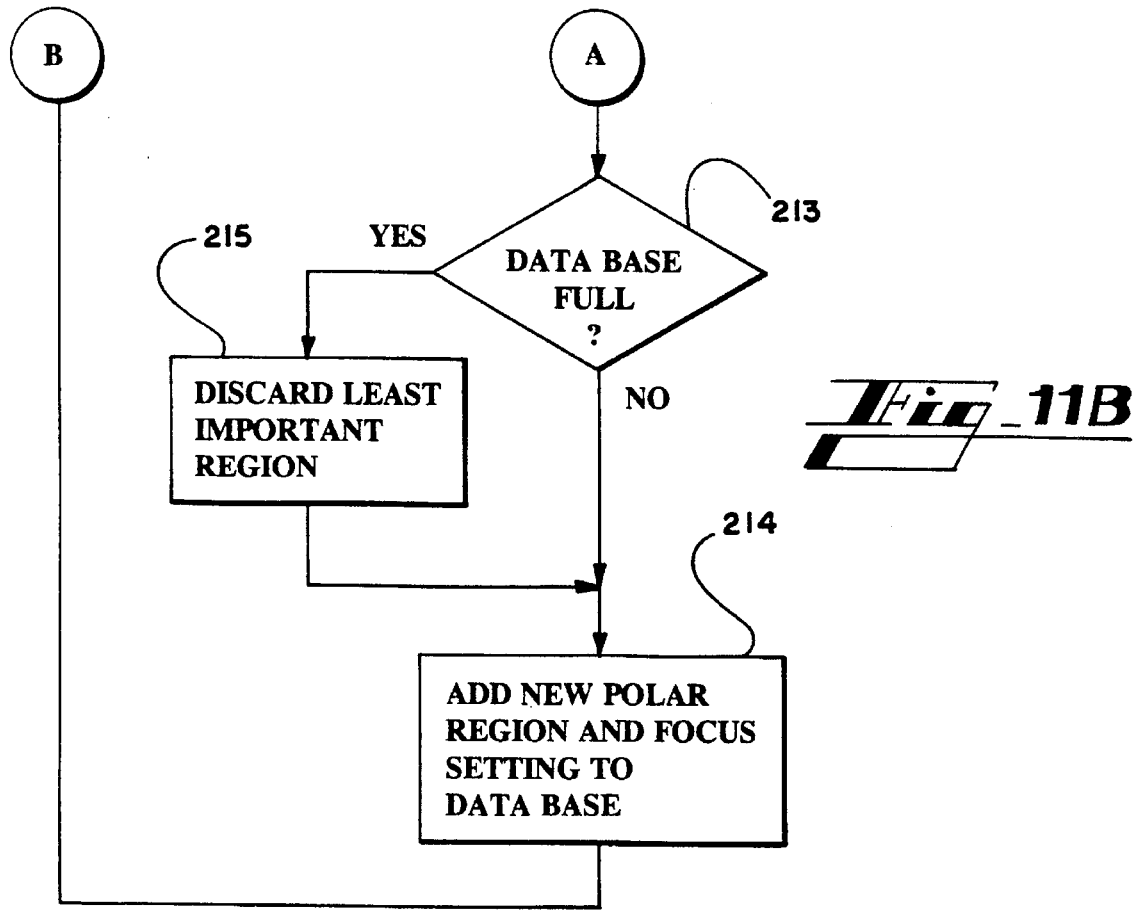

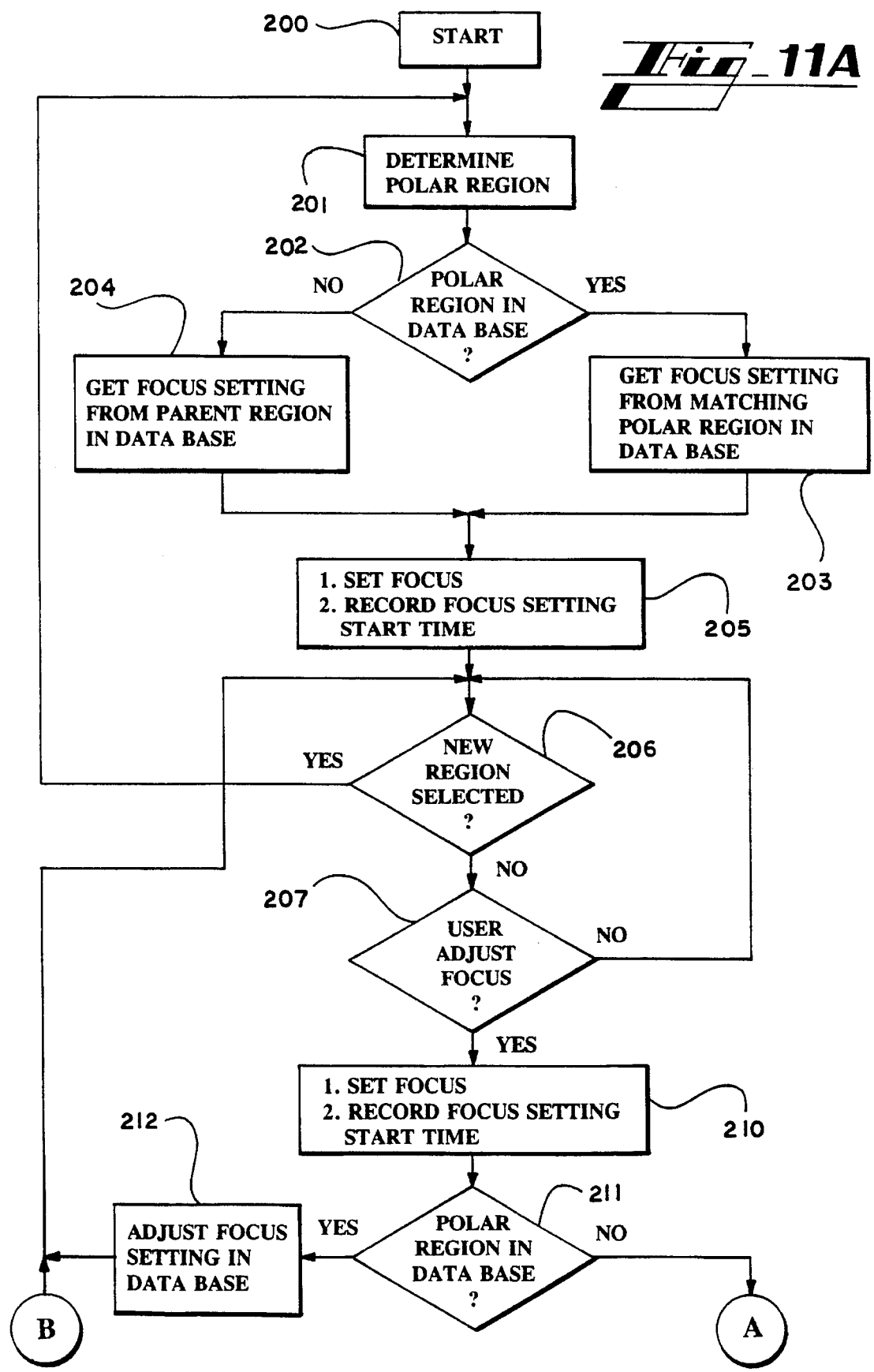
Fig_11A

TO CONVERTER 11G

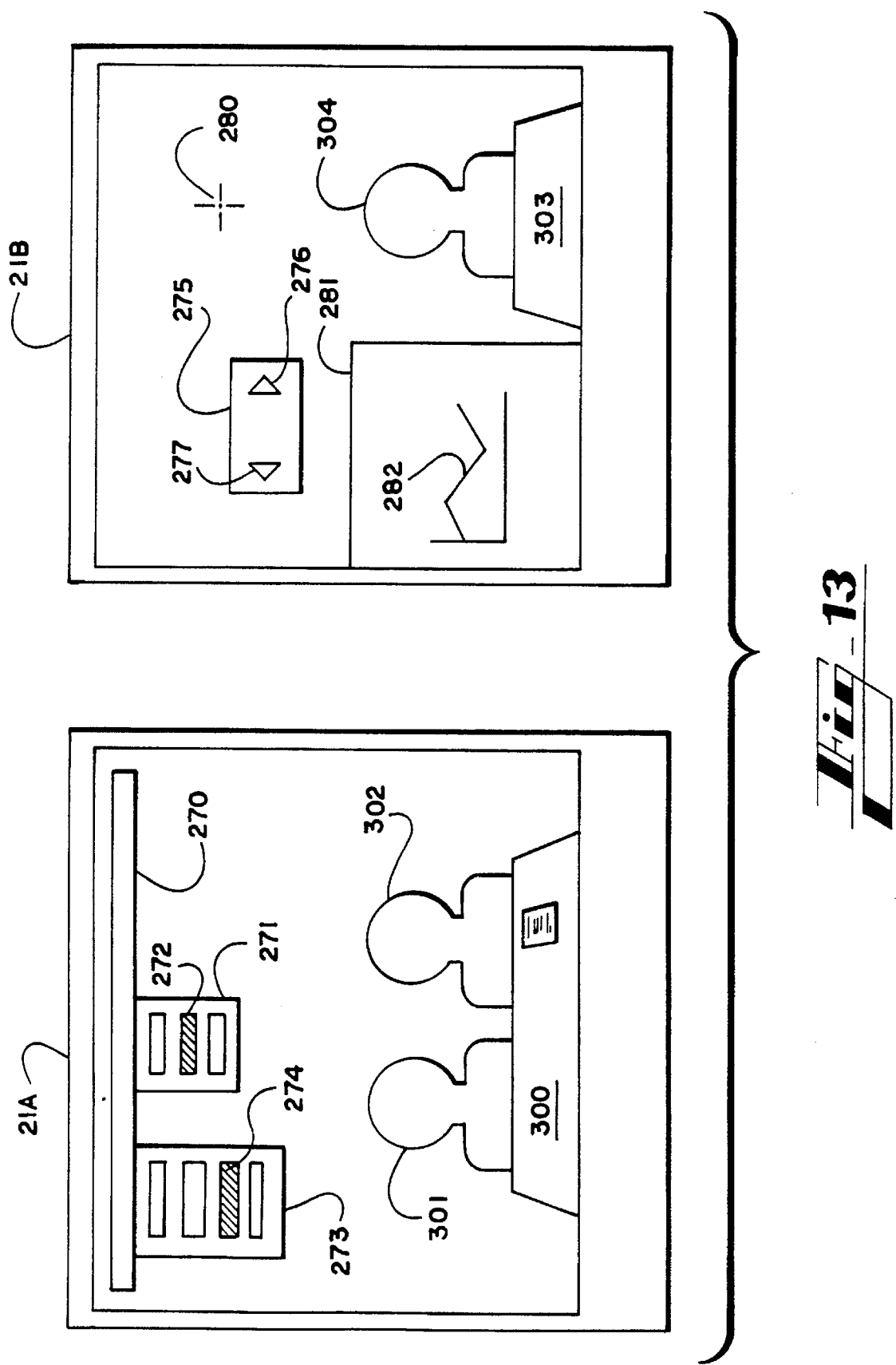

METHOD OF DETERMINING AN ERROR IN A VIDEO CONFERENCING SYSTEM CAMERA

This is a divisional of U.S. Ser. No. 08/139,645, filed Oct. 20, 1993, now abandoned.

TECHNICAL FIELD

The present invention relates to videoconferencing systems and more particularly to a videoconferencing system which can accommodate a plurality of different devices and which provides for ease of operation by the user.

BACKGROUND OF THE INVENTION

Typical prior art videoconferencing systems fall into one of two categories: those where the intelligence is centralized in the coder-decoder (codec) or a system control unit; and those where the intelligence is distributed so that each peripheral device controller has the intelligence necessary to directly control other peripheral devices in the system. One shortcoming of centralized intelligence systems is that such systems are not readily adaptable to accommodate new devices and new versions of existing devices. The addition of another peripheral device beyond the number originally planned for, or the addition of a new type of peripheral device, can require a substantial investment in time and money to accommodate the desired additional device or new device. Furthermore, most centralized intelligence systems have a limited capacity with respect to the number of ports available to connect to peripheral devices. Once this capacity has been reached, new devices can be added only by removing existing devices, such as lesser used devices, or by obtaining another codec or system controller which can accommodate the increased number of devices.

Distributed intelligence systems, such as that shown in U.S. Pat. No. 5,218,627 to Corey, have the shortcoming in that each peripheral device controller must have the intelligence necessary to control every type of peripheral device connected to the network, and every additional peripheral device must have a peripheral device controller which has the intelligence necessary to control all the existing devices on the network. Therefore, the addition of a new type of peripheral device requires new programming to be provided for each of the existing peripheral device controllers, and requires programming of the controller for the new type of device to accommodate the existing peripheral devices.

Therefore, there is a need for a videoconferencing system which can readily accommodate both additional peripheral devices and new types of peripheral devices.

Positioning of video cameras is required for videoconferencing as well as for a number of other activities, such as surveillance. The terms pan, tilt, zoom and focus are industry standards which define the four major axes for which a camera may be adjusted. Traditional camera positioning provides for manual adjustment of these axes, as well as buttons which provide for automatically positioning the camera to a preset location. A preset function recalls the pan, tilt, zoom and focus settings that have been previously ascertained and stored for that preset location.

Traditional videoconferencing systems provide for rather rudimentary control of these camera functions. That is, the user has a control panel for manually controlling camera functions, such as buttons for up/down, left/fight, zoom in/out, and focus. The user can also typically select one of several preset camera settings so that, by the press of a single button, the camera will automatically position and focus itself at some preselected target. Of course, the preset function requires planning because the camera must be manually adjusted for the preset, and then the settings stored. The preset button then merely recalls these settings and adjusts the camera accordingly. If a location has not been preset then the user must manually adjust the pan, tilt, zoom, and focus settings for that location.

However, these controls are not intuitively obvious or easy to use, partly because the user may think that the camera should pan in one direction to center an object whereas, because of the position of the camera with respect to the user and the object, which object may be the user, the camera should actually move in the opposite direction. For example, the user typically sits at a table and faces the camera, and beside the camera is a monitor screen which allows the user to see the picture that the camera is capturing. If the user is centered in the picture, and wishes the camera to center on his right shoulder, the user may think that he wants the camera to pan left because, on the screen as seen by the user, the user's right shoulder is to the left of the user's center. However, the camera should actually pan to the right because, from the camera's viewpoint, the user's right shoulder is to the right of the user's center.

Also, current manual camera positioning techniques typically use a fixed motor speed. This results in the panning being too rapid and the scene flying by when the camera is zoomed in on an object, or in the panning being too slow and the scene taking a prolonged time to change to the desired location when the camera is in a wide field of view setting (zoomed out).

Furthermore, in traditional videoconferencing systems, when the camera is moving from to a preset location the pan and tilt systems move at the same rate. If the required pan movement is different than the required tilt movement then the camera will have completed its movement along one axis before it has completed its movement along the other axis. This makes the camera movement appear to be jerky and unnatural.

After the user has completed the process of changing the camera position the user may have to refocus the camera. As chance would have it, the first attempt to refocus the camera usually is in the wrong direction. That is, the user inadvertently defocuses the camera. The learning process is short, but the need to focus creates delays and frustration.

When the system has multiple cameras which are subject to control by the user, typical systems require the user to use buttons on the control keyboard to manually select the camera to be controlled, and/or assigning separate keys to separate cameras. Frequently, the user will select the wrong camera, or adjust the wrong camera.

SUMMARY OF THE INVENTION

The present invention provides a video teleconferencing system which combines a central intelligence with distributed intelligence to provide a versatile, adaptable system. The system comprises a controller and a plurality of network converters. Each network converter is connected to a system network as well as to one or more peripheral devices. The controller contains the software necessary for its own operation as well as the operation of each of the network converters. The user selects the type of device that is connected to a network converter and the controller sends the software appropriate to that type of device to the network converter. The network converter loads the software into its own memory and is thereby configured for operation with that type of device. This allows a network converter to be quickly programmed for a particular peripheral device. This also allows for quick and convenient upgrading of the system to accommodate new devices. Rather than having to design a new network converter for each type of new peripheral device, software for that new device is written and stored in the controller. The software can then be loaded into a network converter when that new device is added to the system. Therefore, existing network converters can be used to accommodate new devices. This reduces the number and type of network converters that must be maintained in inventory and also minimizes the obsolescence of network converters as new devices and new versions of existing devices become available.

In addition, the present invention provides that the controller will perform conversion of instructions from the initiating device, such as a mouse, to the controlled device, such as a camera. This allows for easy and convenient upgrading of the system to accommodate new devices because the peripheral devices do not need to understand the signals from other peripheral devices. The controller performs the necessary device-to-device signal translation. For example, one network controller will convert signals from a mouse into network standard control signals which represent the mouse movement, such as left, right, up, down, button 1 depressed, button 1 released, etc., regardless of the type of mouse being used. The controller then inspects these network standard control signals to determine the type of action requested by the user. The controller then generates network standard control signals corresponding to the desired action and places these signals onto the network. Examples of network standard control signals intended for the control of a camera might be pan left, pan right, etc. The camera network converter then performs a conversion of the network standard signals from the controller into the type of control signals required for that particular camera, such as +12 volts, −12 volts, binary command 0110, etc. When a new type of peripheral device, such as a new camera, is added the new device may require control signals which are completely different than any existing device so the control signals presently provided by the camera network converter would not give the desired results. In the present invention the network standard signals do not change. Rather, new software is written for the camera network converter so that the camera network converter provides the appropriate signals to the new camera, such as +7 volts, −3 volts, binary command 100110, etc. In this manner, peripheral devices from different manufacturers and new peripheral devices are readily accommodated by adding new software for the controller. The user can then instruct the controller to load the new software into the converter so that the converter is now configured for the new device.

The present invention also provides for control of devices on remote systems. The use of network standard signals allows a user at a local site to easily control a device at a remote site, even if the controller at the local site does not have software appropriate for that type of device. The controller at the local site receives the network standard signals corresponding to the action taken by the user and determines the action (pan left, pan right, etc.) required at the remote site. The local controller then sends the network standard signals for the action to the remote controller. The remote controller receives the network standard signals from the local controller and sends these network standard signals to the remote network converter for the device, and the remote network converter does have the appropriate software for the remote device. The remote network converter then converts the network standard signals into the signals appropriate for that type of peripheral device.

The present invention provides alternative methods of adjusting the pan, tilt, zoom and focus of a camera. In one method the user positions a pointer over an object displayed on a monitor and clicks a mouse button. This causes the camera to be automatically positioned so as to center the object in the monitor display. In another method the user uses the pointer to draw a rectangle around the object or area of interest. This causes the camera to be automatically positioned to center the object in the monitor display and adjust the zoom and focus so that the designated area in the rectangle fills the display. This is a substantial improvement over prior art systems in that a camera may be automatically positioned for objects or areas for which there are no preset values.

The present invention provides an improvement to panning. The panning speed is automatically adjusted in accordance with the current zoom (field of view) setting. When the camera is zoomed in, panning will occur at a slow rate so that objects do not fly by at high speed. When the camera is zoomed out, panning will occur at a fast rate so that objects do not crawl by at slow speed. The result is that, regardless of the zoom setting, objects appear to move across the scene at a fixed, comfortable rate, which is user selectable.

The present invention provides an improvement to panning and tilting the camera. When the camera position is to be changed, the time to complete the change in the pan position is determined and the time to complete the change in the tilt position is determined. Then, the faster process is slowed down so as to be completed at the same time as the slower process. This causes the camera to move smoothly and linearly from the starting position to the ending position.

The present invention provides a method for automatically focusing the camera. Each time that the camera is positioned toward and manually focused on an object or area the system automatically stores the camera position and the focus setting. When the camera is next positioned toward the object or area the system automatically recalls the stored focus setting and implements that setting. The present invention defines relationships between regions so that a focus setting may be determined even if that region has not been used before.

The present invention further provides for automatic selection of the camera to be controlled. The user simply positions a pointer over the desired scene and the system automatically selects, for further control, the camera which is providing that scene. This method is particularly useful when picture-within-picture, split screen, and four-quadrant screen displays are in use.

BRIEF DESCRIPTION OF THE DRAWING

FIGS. 6A and 6B are an illustration of the operation of the automatic zoom feature of the present invention.

FIG. 7 is a flow chart of the method for controlling the aim point and the zoom operation of the camera.

FIG. 9 is a schematic block diagram of an audio unit control node.

FIGS. 10A–10C are illustrations of the relationship between regions.

FIGS. 11A and 11B are a flow chart of the camera focusing process.

FIG. 13 is an illustration of a two-monitor videoconferencing system of the present invention.

DETAILED DESCRIPTION

Turning now to the drawings, in which like numerals reference like components throughout the several figures, the preferred embodiment of the present invention will be described.

System Overview

Figure 1:
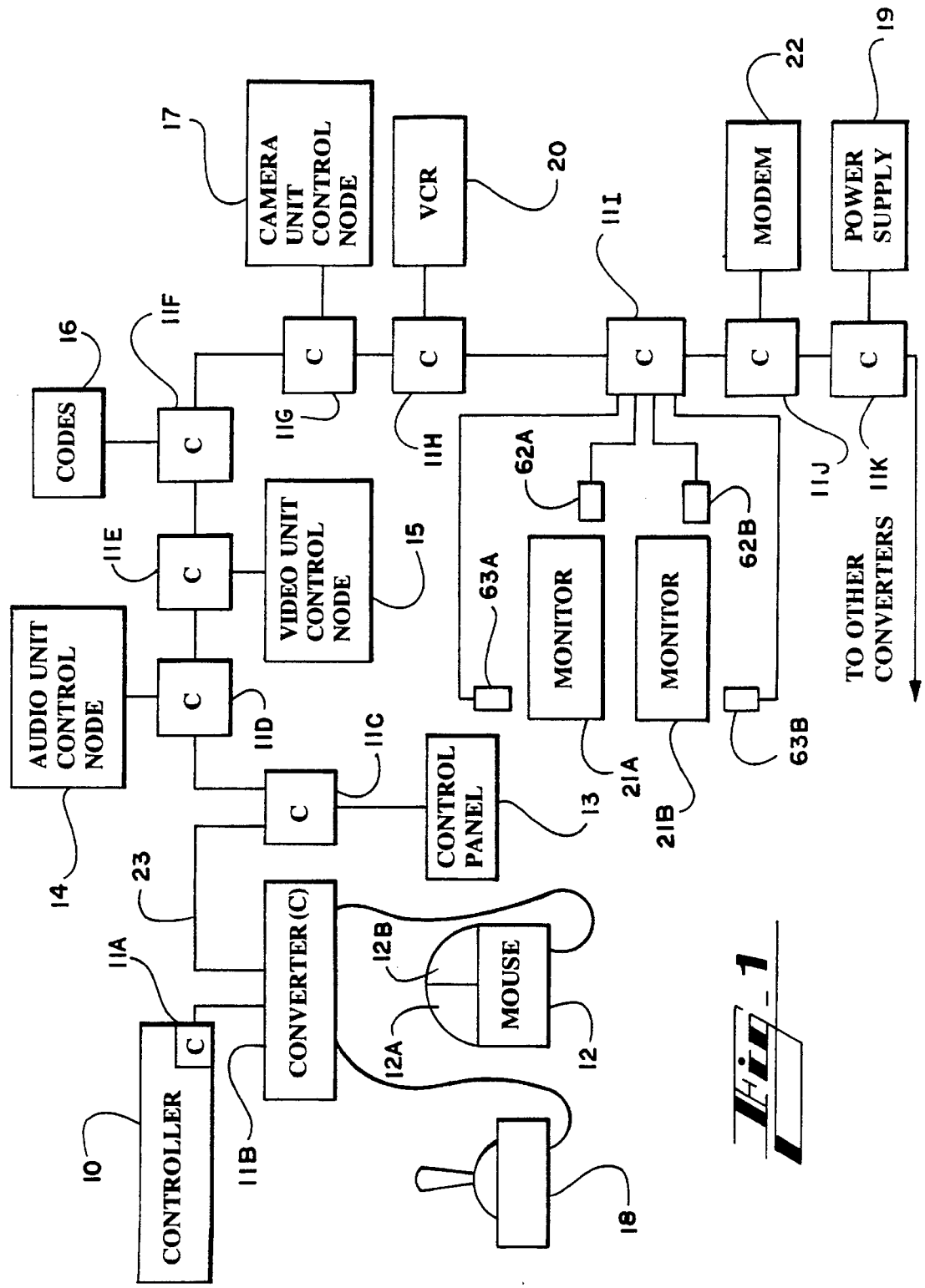
FIG. 1 is a block diagram of the preferred embodiment of the present invention.

FIG. 1 is a block diagram of the preferred embodiment of the present invention. The videoconferencing system comprises a controller 10, a plurality of network converters (C) 11A–11K connected to a network 23, a mouse 12, a control panel 13, an audio unit control node 14, a video unit control node 15, a coder-decoder (codec) 16, a camera unit control node 17, a joystick 18, a power supply 19, a video cassette recorder/playback unit (VCR) 20, monitors 21, and a modem 22. The video teleconferencing system also comprises items which, for the sake of clarity, are not shown in FIG. 1, such as: cameras, pan/tilt and zoom/focus units for the cameras, microphones, speakers, audio cabling, video cabling, and telephone and power wiring. Each device 10, 12–22 is connected to a converter 11A–11K. The converters are connected, preferably in a daisy-chain (serial) manner, via the network designated generally as 23. Converter 11A is shown as part of controller 10, and converters 11B–11K are shown as being stand alone components which are separate from their respective connected devices 12–22. However, this is merely a preference and any converter 11 may be a stand alone component or may be a part of its associated device. In the preferred embodiment, the network 23 is the LON-based network developed by Echelon, Inc., Palo Alto, Calif. However, other networks, such as Ethernet, may be used.

Each converter 11 contains information which either converts network standard signals on network 23 into control signals for the connected device 10, 12–22, converts control/status signals for the connected device(s) into network standard signals for network 23, or both. For example, network controller 11B will convert signals from the mouse 12 into network standard control signals which represent the mouse movement, such as left, right, up, down, button 1 depressed, button 1 released, etc. Network converter 11B provides the same network standard control signals for a particular type of mouse movement regardless of the type of mouse being used. In operation, network standard control signals from control devices such as mouse 12, control panel 13, joystick 18 or codec 16, are sent, via converters 11 and network 23, to controller 10. It is also possible for a single converter to service two or more devices, such as converter 11B servicing mouse 12 and joystick 18, and converter 11I servicing two monitors 21A and 22B. When sending information concerning the user's movement of devices 12 or 18, converter 11B also sends information as to whether the activity is associated with the mouse 12 or the joystick 18. The controller 10 then inspects these network standard control signals to determine the type of action requested by the user and the device which should take the action, generates network standard control signals corresponding to the desired action, and places these signals onto the network 23. As in any network, a converter 11 inspects the address of the incoming network standard signals on the network 23 to determine if the data is intended for that converter or its connected device. If so, then the converter 11 will capture the data, which is a network standard control signal representing the desired action, and convert the data into the appropriate type of signal for the connected device.

For example, assume that the user has used the mouse 12 to select a camera (not shown in FIG. 1) and has moved the mouse in a direction which indicates that the selected camera should pan to the left. The mouse movement signals are converted by converter 11B into network standard control signals indicating, for example, the direction of the movement of the mouse and the status of the buttons on the mouse (depressed, not depressed). Converter 11B then generates an address for controller 10 and places these network standard signals on network 23. Converters 11C–11K ignore these signals because the address indicates that the signals are not for them. Converter 11A recognizes the address as its own, captures these signals, and provides the signals to controller 10. Controller 10 determines that the network standard control signals signify a mouse movement corresponding to an instruction for the selected camera to pan to the left and, accordingly, generates network standard control signals corresponding to such camera movement. Controller 11 then instructs converter 11A to address these signals to the network converter for pan/tilt unit control node 17 and to place these signals on network 23. Converter 11G recognizes the address as its own (or as intended for its connected pan/tilt device), and captures the network standard signals. Converter 11G then generates control signals appropriate for the type of pan mechanism (not shown) used with the selected camera.

Therefore, even if the type of mouse is changed or the type of pan/tilt mechanism is changed, the network standard signals from the mouse or to the pan/tilt mechanism will not change. Rather, the network converters 11 will convert the signals from the mouse 12 into network standard signals and will convert the network standard signals into signals appropriate for the pan/tilt mechanism.

As an example, the signals from mouse 12 may indicate that mouse 12 is being moved to the left at a certain rate and the appropriate signals provided to the pan motor may be +12 volts or, if the pan motor has a digital controller or interface, the signals provided by converter 11G may be a binary signal such as 101011 or some other code which corresponds to the code and format required to achieve the specified action.

It will be appreciated that, for a simple action, such as pan left or right and tilt up or down, controller 10 may not be required and converters 11B and 11G may be programmed to achieve the desired correspondence between the movement of the mouse 12, the depression of keys on control panel 13, and movement of the pan motor. However, in the preferred embodiment, mouse 12 is also used to specify functions which do not have a one-to-one correspondence between mouse movement and pan motor action, such as the point-and-click and the draw-and-release operations described below and therefore all network signals are directed to or come from controller 10.

Similarly, status information from monitor control node 21 is addressed by converter 11I to controller 10 (converter 11A) and then placed on network 23. Controller 10 then inspects the status information to determine if the selected monitor (not shown) is in the proper mode, such as on or off.

Control panel 13 is a conventional videoconferencing system control panel, well known in the art, and provides, via buttons, such functions as pan left, pan right, tilt up, tilt down, mute on/off, zoom in/out, focusing, presettable camera settings, and volume up/down. Audio unit control node 14 controls the flow of audio signals among the devices which send or receive audio signals, such as microphones, speakers, codec 16, telephone lines, and VCR 20. Video unit control node 15 controls routing of video signals among the different devices which send or receive video signals such as codec 16, VCR 20, cameras, and monitors 21. Codec 16 provides conventional codec functions. Camera unit control node 17 controls the pan, tilt, zoom, and focus of the cameras and provides feedback regarding these parameters. Power supply 19 provides operating power for the converters 11 and also for the other devices 10, 12–18, 20–22 connected to the system. VCR 20 is a conventional video cassette recorder/playback device. Monitors 21 are commercially available monitors and, in the preferred embodiment, are Mitsubishi color televisions, model CS-35EX1, available from Mitsubishi Electronics America, Inc., Cypress, Calif. Modem 22 is a conventional modem, preferably having a data communications rate of at least 9600 bits per second.

Those of skill in the art will appreciate that a typical codec 16 has a port for connection to one or more dial-up or dedicated telephone lines. There are several different protocols which can be used for codec-to-codec communications. If the codecs are using the same protocol then they can negotiate as to what features, such as data transfer rate, data compression algorithms, etc., are to be used in the videoconferencing session. However, the codecs must be configured to use the same protocol or information transfer is not possible. If one codec has been configured to use a first protocol and a second codec has been configured to use a second protocol then the codecs will not be able to communicate. Codecs generally have a keypad and a display which are used for setting up the codec. However, the codes for setting up and the display indicating the stage of setup or the results of the entered code are typically not intuitive. Therefore, setting up (configuring) a codec for a particular protocol is, in most cases, a tedious and time consuming task which is preferably performed by a technician who is familiar with the instruction and result codes used by that codec. However, codecs have a data port which can also be used for to transferring data as well as for setting up the codec. This data port is advantageously used in the present invention to allow a codec 16 to be configured by the controller 10. In the preferred embodiment, codec 16 is a type Visualink 5000, manufactured by NEC America, Inc., Hillsboro, Oreg.

Using, for example, the mouse 12 or the control panel 13, the user can instruct controller 10 to establish the videoconferencing session. Controller 10 will, via converters 11A and 11F and network 23, instruct codec 16 to dial up or otherwise access the remote codec (the codec at the other videoconferencing location). Codec 16 will then attempt to establish communications with the remote codec. If communications are successfully established the codecs will negotiate what features will be used and then the session may begin. However, if communications cannot be established, such as because the codecs are configured for different protocols, the local codec 16 will report to controller 10 that codec 16 was able to contact the remote codec but was unable to establish communications (handshake) with the remote codec because the remote codec was using a different protocol. Controller 10 will then, via converters 11A and 11N, instruct modem 22 to dial up the remote modem (the modem for the videoconferencing system at the other location). Once controller-to-controller communications have been established via modem then controller 10 can instruct the remote controller to configure the remote codec for a particular protocol. The remote controller will take action, if necessary, to configure the remote codec to the same protocol. Conversely, controller 10 can receive information from and/or negotiate with the remote controller as to the protocol(s) supported by, or the current configuration of, the remote codec and then configure codec 16 to the same protocol as the remote codec. Then, controller 10 can again instruct codec 16 to establish communications with the remote codec and, as both codecs have now been configured to the same protocol, the codecs can establish communications and negotiate features, and the videoconferencing session can begin.

The present invention also provides for local control of remote devices. In addition to controller 10 being able to communicate with any device 12–18, 20–22 on the local network 23, controller 10 may also communicate with a similarly situated controller at a remote site (not shown) via the data port on codec 16. The user, using mouse 12, control panel 13, or joystick 18, may command a particular action to be performed at the remote site, such as panning the remote camera to the left or right, tilting the remote camera up or down, etc. The user's actions are converted into network standard control signals and these signals are sent by converter 11B to controller 10. Controller 10 determines the action required at the remote site and sends, via network 23 and codec 16, network standard control signals corresponding to the action to the remote controller. The remote controller then sends, via its own network, the network standard signals to the converter for the remote pan/tilt unit. The remote converter then generates the appropriate instruction for the remote pan/tilt unit control node which, in turn, causes the pan/tilt mechanism for the selected remote camera to perform the action specified by the user at the local site. The user at the local site can therefore control all of the functions of all the devices at the remote site that the remote user can control at the remote site, even if the remote site has devices available which are not available at the local site. However, in practice, some functions at a site are preferably controlled only by the user at that particular site, such as microphone muting, monitor on/off operation, and speaker volume control settings.

The present invention also provides for system diagnostics. In the preferred embodiment, camera unit control node 17, in addition to receiving instructions from controller 10, also reports the results of an instruction to controller 10. Each pan/tilt unit has a position indicator, either as part of the unit or as a retrofit device. The position indicator indicates the current pan position and the current tilt position. The camera unit control node 17 accepts the position signals from the position indicator and provides these signals to the controller 10. Controller 10 inspects these signals to determine whether the selected pan/tilt unit is taking the proper action with respect to the control signals. For example, assume that controller 10 has instructed a particular pan/tilt unit to pan in a certain direction at a certain rate but that the pan/tilt unit either does not pan, or pans at a different rate. The camera unit control node 17 reports the response of the selected pan/tilt unit to controller 10. If the response of the selected pan/tilt unit is improper then controller 10 will cause a report to be generated which alerts the system operator to the problem. The report may be provided in a number of ways. For example, the presence of the report may be indicated by an icon on the screen of a monitor 21. This alerts the system operator to select the report to ascertain the nature of the problem. Or, the controller 10 may cause a report to be printed, either by a printer (not shown) connected to a printer port on controller 10 or by a printer (not shown) connected as another device on the network 23. The report may also indicate the severity of the problem. For example, a slow pan is generally not a critical item, but indicates that the pan/flit unit should be serviced in the near future to prevent the complete failure of and/or damage to the unit. Conversely, a unit which does not pan at all requires immediate servicing as continued attempts by the user to cause that pan/tilt unit to pan could result in gear damage or motor burnout.

Modem 22 also allows for remote diagnostics and reporting. If the videoconferencing system is, for example, being serviced by a remote party then the remote party can, using a personal computer and a modem, call up modem 22, establish communications with controller 10, and instruct controller 10 to send, via modem 22, the current system diagnostics. Furthermore, controller 10 can be programmed to use modem 22 to call up the remote party, establish communications with the remote computer, and automatically send the current system diagnostics. The programming may specify that the call is to be performed at a certain time of day, such as during off-duty hours, or whenever a serious failure occurs, such as the complete failure of a pan/tilt unit, or both.

The controller-to-controller communications, via either codecs or modems, also allows the controller at one site, such as a remote site, to inform the controller at another site, such as the local site, that a particular device or function is inoperative at the remote site. Then, when the user attempts to use that device or function the local controller will disregard the instructions from the user and inform the user that that device or function is out of service.

Controller 10, in addition to performing system diagnostics, also attempts simple system repairs. For example, if the pan/tilt unit will not pan in one direction, controller 10 will instruct the pan/tilt unit to pan in the other direction so as to attempt to dislodge any cable which may be snagged. If this action is successful and the pan/tilt unit is then operational controller 10 will log the failure and the repair so that the service technician will know to inspect that unit for loose or snagged cables and to service that unit. If the action is not successful then controller 10 will disregard future instructions from the user as to the desired movement of that pan/tilt unit and will not attempt to send further instructions with respect to the failed function. That is, pan instructions will not be sent because the pan function is not operative, but tilt instructions may be sent because that function still operates properly. However, as another option, controller 10 may be programmed to cause operating power to be entirely removed from the failed pan/tilt unit.

Similar action and reporting may be taken with respect to other functions and devices. For example, the camera unit control node 17 also controls the zoom and focus of the connected cameras (not shown). In the preferred embodiment, the cameras have a zoom position indicator and a focus position indicator, either as part of the unit or as a retrofit device. Controller 10 can therefore determine whether a selected camera is operating properly. Also, each monitor 21 has an on/off indicator, described below, and converter 11I reports the status of each monitor. Controller 10 can therefore determine whether a selected monitor is on or off. Also, codec 16 performs limited self-diagnostics on its own operation. Controller 10, either in response to an error signal from codec 16, or at periodic intervals, will instruct codec 16 to report its status. Controller 10 can then take the appropriate reporting action, if any is required, and/or switch to another codec (not shown) connected to network 23.

In the preferred embodiment of the present invention the LON network is used because converters 11, in general, draw operating power via the network 23 and do not require a separate source of power nor require power from the connected device. This is advantageous in that the network and the system will continue to function even if a connected device, such as VCR 20 or modem 22, is removed from the network or is powered down.

In the preferred embodiment, a power supply 19 is connected to the network 23 and provides operating power for the converters 11. Power supply 19 also provides operating power, such as 110 VAC or 12 VDC, to each peripheral device. This operating power may be provided via network 23 or provided via separate power cables to each peripheral device. Power supply 19 provides AC and DC power, as required, to each peripheral device. Power supply 19 is connected to converter 11K and may therefore be controlled by the user. This allows the user to turn on and turn off selected peripheral devices, as desired, by removing operating power from the device. This provides an additional way of turning off a device if the device is otherwise non-responsive to signals sent via network 23, and also provides a safety factor in that the user can completely remove operating power from a device. Further, in the preferred embodiment, converter 11K has an internal timer. If there is no user activity, signified by a lack of activity of mouse 12, control panel 13, or joystick 18, then converter 11K will send a "sleep" signal to controller 10. This causes controller 10 to go into a standby mode, thereby conserving power. Converter 11K will also instruct power supply 19 to remove operating power from the peripheral devices. Although converter 11K and power supply 19 are shown as separate devices, it will be appreciated that both functions may be performed by a single device. In an alternative embodiment, power supply 19 is not responsive to signals on network 23 but merely provides operating power for the converters 11. In this embodiment either controller 10 or converter 11K may have the internal timer. In another alternative embodiment, power supply 19 is not used and controller 10 has the internal timer, and also provides operating power for the converters 11 on network 23 via the connection to converter 11A.

In the preferred embodiment, controller 10 is a personal computer, such as a COMPAC Prolinea, having a 120 megabyte hard drive, a 4 megabyte random access memory, and a 3½-inch floppy disk drive. Controller 10 does not need to have a screen or a keyboard because, in the preferred embodiment, a monitor 21 is used as a screen, and mouse 12 and control panel 13 may be used in place of a keyboard. However, if desired, a screen and a keyboard could be connected directly to controller 10. Also, even though mouse 12, joystick 18, and modem 22 are shown as being connected to converters 11 on network 23, it will be appreciated that the converters associated with these devices may be dispensed with if card slots for controlling these devices are available in controller 10 and the distance between the device and controller 10 is not excessive.

Also, even though only one mouse 12, codec 16, joystick 18, VCR 20, and modem 22 are shown it will be appreciated that the present invention is not so limited and a plurality of each type of device may, if desired or necessary, be connected to network 23.

In addition, even though mouse 12, control panel 13, and joystick 18 are shown as being connected to converters 11B and 11C by wiring, it will be appreciated that there are commercially available devices 12, 13, and 18 which do not have a wire connection but, instead, communicate by infrared(IR) signals. These devices may also be used with the present invention. In this case the appropriate network converter 11 would have an IR receiver, would respond to the infrared signals, and would provide the corresponding network standard signals to controller 10. Converter 11I would then be a specialized purpose converter. A specialized purpose converter is described below which transmits IR signals to IR receivers in monitors 21. In this case, the role of transmitter and receiver is reversed, that is, the devices 12, 13, 18 transmit and the converters 11B, 11C receive.

Network Converters

Converters 11 fall into three general classes: serial interface, parallel interface, and specialized purpose. Typically, a codec 16 is a serial interface device and therefore converter 11F would be a serial interface-type converter, whereas a VCR 20 may have a parallel interface and therefore converter 11H would be a parallel interface-type converter. In the preferred embodiment, monitors 21 are of the type which can be remotely controlled by, for example, a handheld infrared remote control. Converter 11I is therefore a specialized type of converter in that it can provide the infrared signals necessary to control the monitors 21 and has the necessary components for monitoring the state of operation of the monitors 21.

Figure 2:
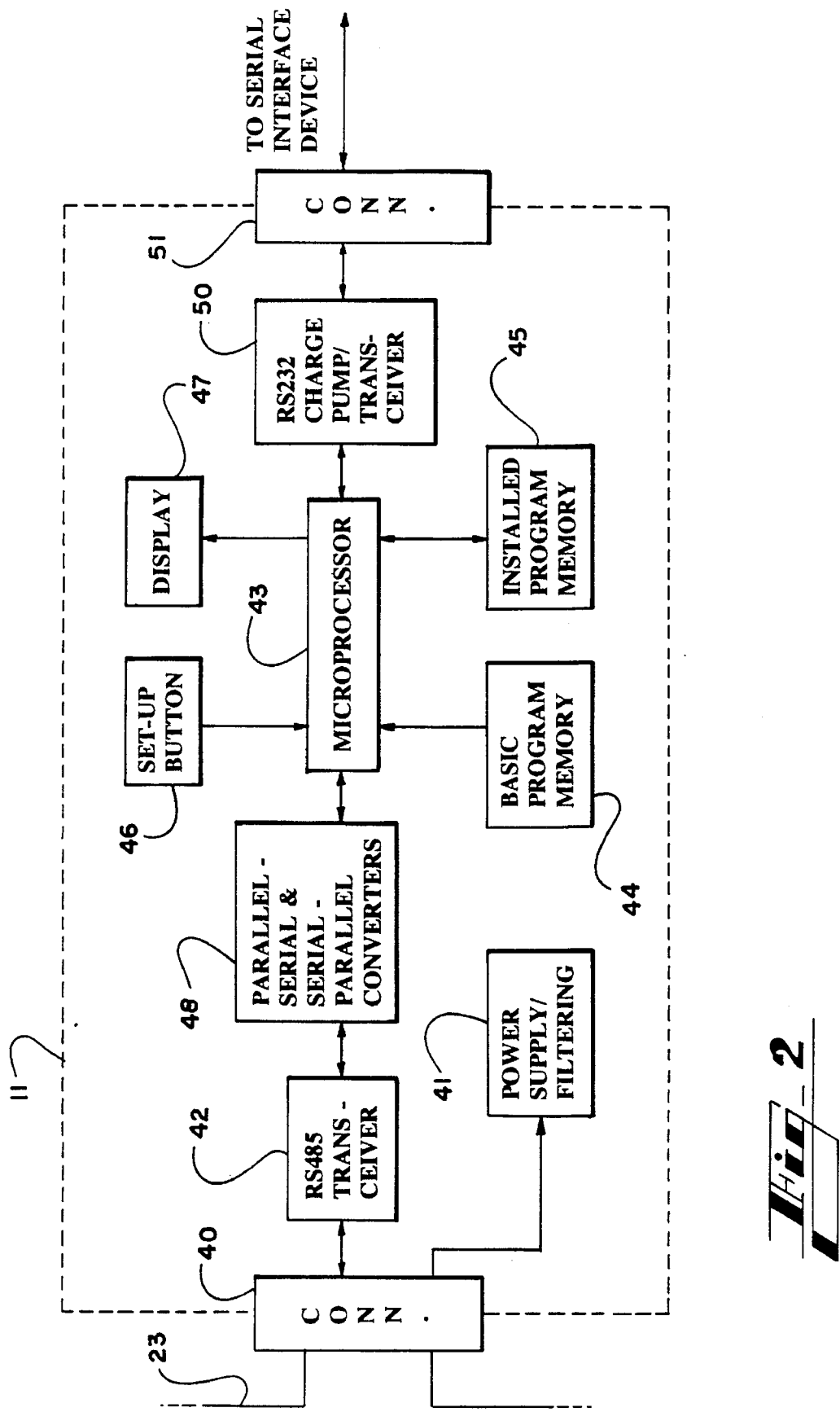
FIG. 2 is a block diagram of a serial interface-type network converter.

FIG. 2 is a block diagram of a serial interface-type network converter 11. A serial-type converter 11 comprises a network connector 40, a power supply/filtering circuit 41, an RS-485 transceiver 42, a parallel-serial and serial-parallel (P/S-S/P) converter 48, a microprocessor 43, a basic program memory 44, an installed program memory 45, a set-up button 46, a display 47, an RS-232 charge pump/transceiver 50, and a serial port connector 51. Connector 40 is connected to network 23 and connector 51 is connected to a serial interface device, such as codec 16. Power supply/filtering circuit 41 draws power from network 23 and provides filtered power to the several circuits of converter 11. Transceiver 42 provides voltage level, balanced-to-single-sided (unbalanced), and single-sided-to-balanced conversion of the signals between network 23 and P/S-S/P converter 48. P/S-S/P converter 48 provides parallel-serial and serial-parallel conversion of the signals between transceiver 42 and the microprocessor 43. In the preferred embodiment, microprocessor 43 is a Neuron microprocessor, manufactured by Motorola Semiconductor Products, Phoenix, Ariz. and the P/S-S/P conversion functions of converter 48 are performed by the microprocessor 43. Basic program memory 44 contains an identification number, such as a serial number, start-up procedures and basic operating instructions for microprocessor 43, such as instructing microprocessor 43 of the port or address of transceivers 42 and 50, button 46 and display 47. In the preferred embodiment, memory 44 is a programmable read only memory (PROM). Installed program memory 45 contains configuration information and operating instructions as to the conversion required between signals present on network 23 and the corresponding signals to be output via connector 51, and vice versa. Examples of the type of information that may be installed in memory 45 are the voltage polarity and voltage levels required to control the connected peripheral device, the binary codes and format required to control the connected peripheral device, and similar information concerning signals that may be received from the connected peripheral device. In the preferred embodiment, memory 45 comprises both an electrically erasable programmable read only memory (EEPROM) and a random access memory (RAM). Button 46 is used to initialize (set up) converter 11, as explained in more detail below. Display 47 is, in the preferred embodiment, a light emitting diode (LED) and is off when microprocessor 43 has been properly set up (configured), and flashes when microprocessor 43 is in the set up mode (not configured).

In the preferred embodiment, controller 10 contains, in its memory (not shown), a plurality of programs for the operation of converters 11. There is a separate program for each type of device that may be connected to a converter. Converters 11F and 11J are both serial interface-type converters. However, one is connected to codec 16 and the other is connected to modem 22, and therefore each requires different operating instructions so as to properly interface with the connected device. Therefore, for each type of converter, there is a separate program for each type of device which may be connected to that converter. A program, which may include software, firmware, data, formats, conversion codes, etc., is downloaded from controller 10 to the selected converter 11 so as to properly configure the converter 11 for the type (serial, parallel, specialized) of converter that it is and also for the type of device with which it will be connected. This provides flexibility in that if a new type of device is to be connected to the network then a program is written for that type of device and loaded into controller 10. Controller 10 then downloads the program to the converter 11 which is connected to that new type of device. Therefore, in general, a serial interface-type converter can be used with any serial interface device by simply downloading the appropriate serial interface program from controller 10 into that converter 11, and likewise for parallel interface-type devices. Also, additional devices can be easily supported by using the appropriate generic (serial-type or parallel-type) converters and then causing controller 10 to download the appropriate programs to each of the added converters. This reduces the inventory of different types of converters that the user must have on hand to repair or add to the system.

In the preferred embodiment, memory 45 in a serial-type converter 11 is not programmed with the installed program at manufacture, although it could be so programmed if desired. Therefore, when a converter 11 is first installed in the videoconferencing system and power is applied, the converter 11 will not be configured. Furthermore, if the user changes the type of serial device connected to the converter 11, such as disconnecting converter 11 from codec 16 and connecting converter 11 to modem 22, then converter 11 will be improperly configured for the newly connected device. Therefore, the user will press set up button 46, which causes microprocessor 43 to cause display 47 to begin blinking. Also, microprocessor 43 will send its identification number and type to controller 10 along with a network standard signal which advises controller 10 that converter 11 needs to be configured.

The user will then go to controller 10 and, preferably using mouse 12, pull down an initial set up menu (not shown). The set up menu will list the last converter 11 which has reported a need to be configured. Then, the user will pull down another menu which lists the types of serial interface devices supported by the videoconferencing system. Once the connected serial device is identified by the user controller 10 will download, via network 23, the program necessary to allow converter 11 to interface between network 23 and the connected serial device. Microprocessor 43 will install this program in the installed program memory 45. Microprocessor 43 and memories 44 and 45 are shown as separate components for clarity but may be in a single device. If converter 11B has not been previously configured then a mouse, such as mouse 12, may be connected to a mouse control port on controller 10 in order to configure converter 11B. Thereafter, the remaining converters may be configured using either mouse 12 or the mouse connected directly to controller 10.

Figure 3:
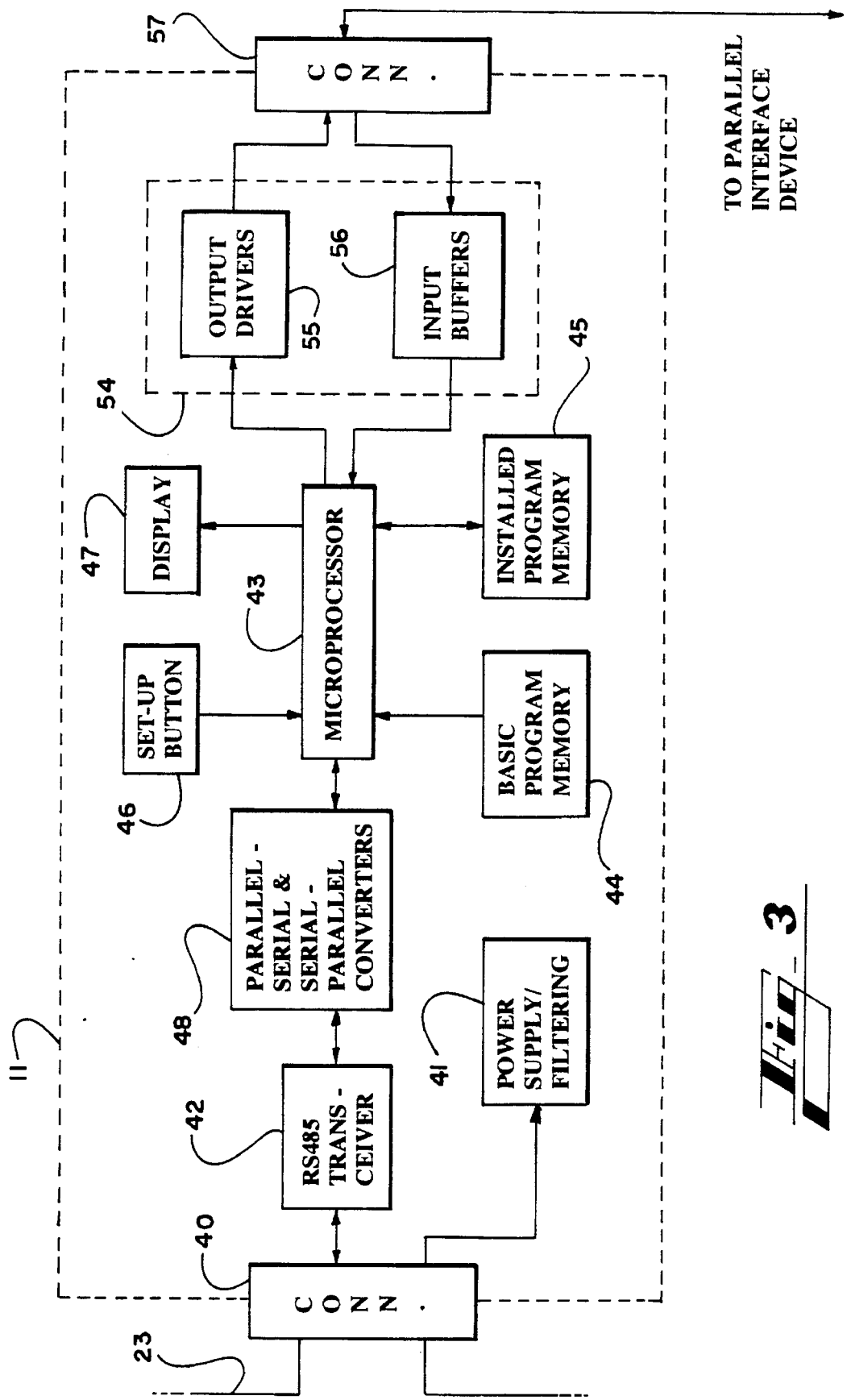
FIG. 3 is a block diagram of a parallel interface-type network converter.

FIG. 3 is a block diagram of a parallel-interface type network converter 11. A parallel-type converter 11 is similar to that of a serial-type converter except that, instead of transceiver 50 and connector 51, converter 11 will have an output transceiver 54 and a parallel connector 57. Output transceiver 54 comprises output drivers 55 and input buffers 56. Preferably, transceiver 54 provides isolation between microprocessor 43 and the parallel interface device. Also, device 54 is preferably configurable by microprocessor 43 to select which pins on connector 57 are output pins and which pins are input pins. Devices which perform, or can be readily connected to perform, the functions of transceiver 54 are well known in the art. In the preferred embodiment, the functions of transceiver 54 are performed by the indicated Neuron microprocessor 43. The operation of a parallel-type converter 11 is identical to that of a serial-type converter except that the inputs and outputs on connector 57 are configured for a device which is a parallel interface device, such as VCR 20.

Figure 4:
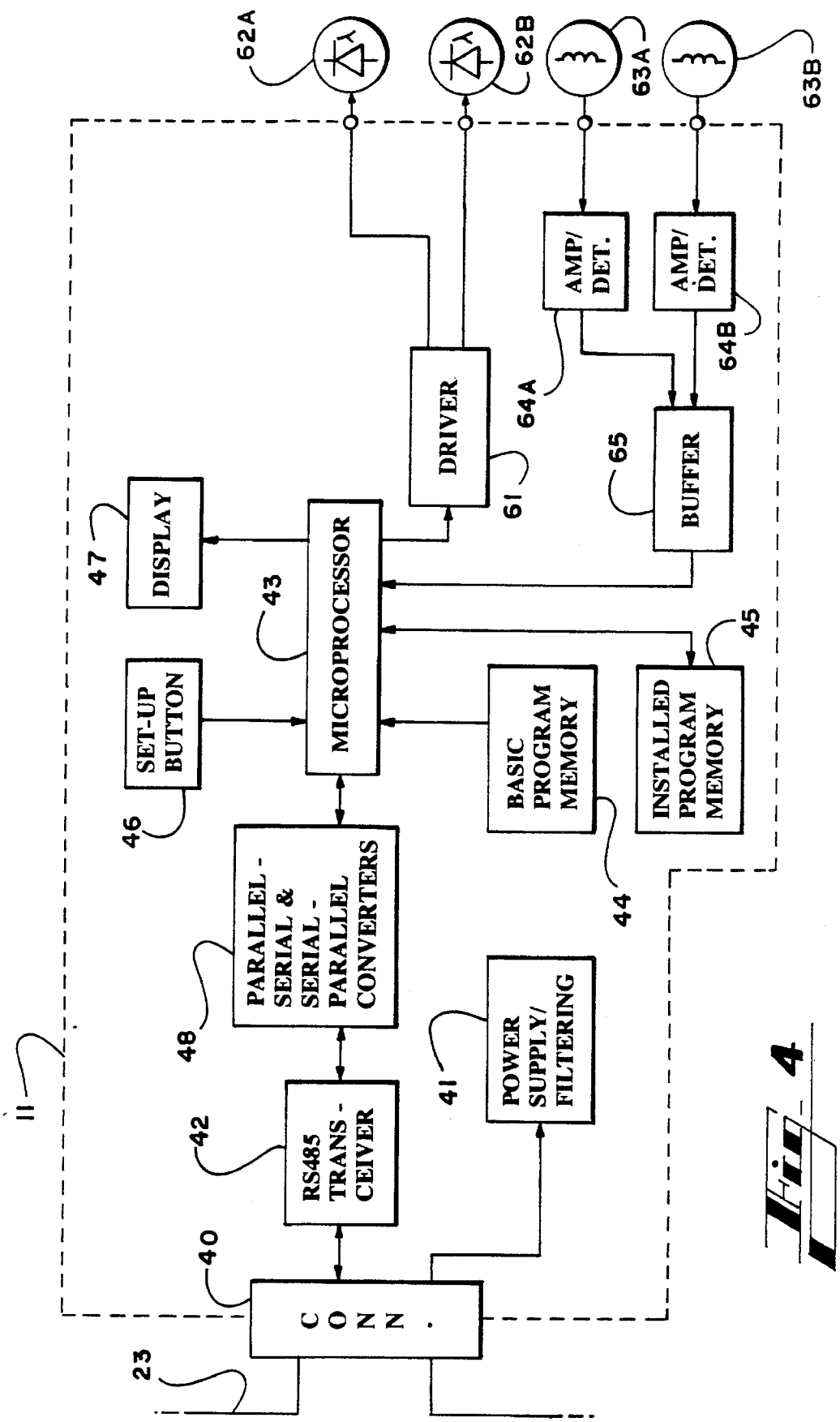
FIG. 4 is a block diagram of a specialized-type network converter.

FIG. 4 is a block diagram of a specialized-type network converter, such as converter 11I. A specialized converter is useful in cases where the connected device does not have a serial or parallel interface or where that interface is already in use for some other purpose, but where there are also other means of controlling the device, such as by infrared signals or voltage level and/or polarity signals (analog signals). Converter 11I, which interfaces with monitors 21, is an example of a specialized converter. Like the serial-type and parallel-type converters, a specialized-type converter has a connector 40 for connection to the network 23, a power supply/filtering circuit 41, an RS-485 transceiver 42, a microprocessor 43, a basic program memory 44, an installed program memory 45, a set up button 46, and a display 47. In addition, specialized converter 11 has a driver 61, which is capable of driving infrared (IR) LEDs 62A and 62B. Only two IR LEDs are shown, corresponding to two monitors 21, for convenience, but more monitors 21 may be used. Each monitor 21 is, in the preferred embodiment, controllable by the use of infrared signals and has an infrared detector built into the monitor 21. This type of monitor is well known in the art. An IR LED, such as 62A, is positioned in front of the infrared detector on the monitor 21 so that microprocessor 43 can send signals to driver 61, which provides the signals to the LED 62A, which emits the infrared signals appropriate to cause monitor 21 to perform a particular action, such as turning on or off, turning the volume up or down if the speaker in monitor 21 is being used, adjusting brightness, contrast, etc.

In addition, a coil, such as coils 63A and 63B, is attached to each monitor 21. A coil 63 is used to pick up the magnetic field of the horizontal deflection coils present in a monitor 21. Coils 63A and 63B are connected to amplifier/detectors 64A and 64B, respectively. An amplifier/detector 64 amplifies the signal provided by a coil 63 and detects (rectifies) the signal. The output of each amplifier 64 is connected to buffer 65, which is connected to microprocessor 43. Buffer 65 provides any necessary buffering and voltage level shifting between the output of amplifier/detector 64 and microprocessor 43. The on/off control signal in many monitors 21 is the same signal and the monitor 21 merely toggles between an on state and an off state. To determine whether a monitor 21 is on or off a coil 63 is attached to the monitor 21 to pick up the radiation emitted by the horizontal deflection coil in that monitor 21. If the user sends an instruction to turn on a monitor 21 the microprocessor 43 will inspect the output of buffer 65 to determine if the coil 63 and amplifier/detector 64 associated with that particular monitor 21 are detecting radiation. If radiation is being detected then the monitor is already on and microprocessor 43 will not take any action. However, if monitor 21 is off then radiation will not be detected and, consequently, microprocessor 43 will cause driver 61 to pulse an LED 62 with the code required to toggle the on/off control of that monitor 21. Microprocessor 43 will then check the output from the coil 63 to determine if the operation was successful. If the operation was successful then microprocessor 43 will take no further action. However, if monitor 21 does not turn on then microprocessor 43 will attempt several more times to turn on the monitor 21. If, after several attempts, the monitor 21 is still not on then microprocessor 43 will report the failure to controller 10.

In the preferred embodiment, coils 63 are a type 70F103AI, manufactured by J. W. Millen, Rancho Dominguez, Calif. The positioning of the coils 63 on the monitors 21 is not extremely critical but it is preferred to place the coils 63 in a position to receive the maximum pick up when a monitors 21 is on so that the reliability of the on/off indication is consistently high.

If a converter 11 is only to be used with a certain type of monitor then the basic program memory 44 may contain the necessary IR transmit instructions, and so install program memory 45, set-up button 46, and display 47 will not be needed. However, if converter 11 may be used with different types of monitors then the necessary instructions for the several types of monitors may be included in basic program memory 44 or, alternatively, the type of monitor being used may be selected from a pull-down menu at controller 10 and the necessary IR transmit program downloaded from controller 10 in memory 45.

Camera Positioning

In practice, many of the tests and/or functions shown in the figures are performed by programs or subroutines which are simultaneously active so that one test and/or function may be performed concurrently with another test and/or function. That is, tests for mouse movement, mouse button depression/release, joystick movement, control panel selections, etc., are performed continuously or may be interrupt driven functions. However, for clarity of illustrating the operation of the present invention, flowcharts are used.

Figure 5A:
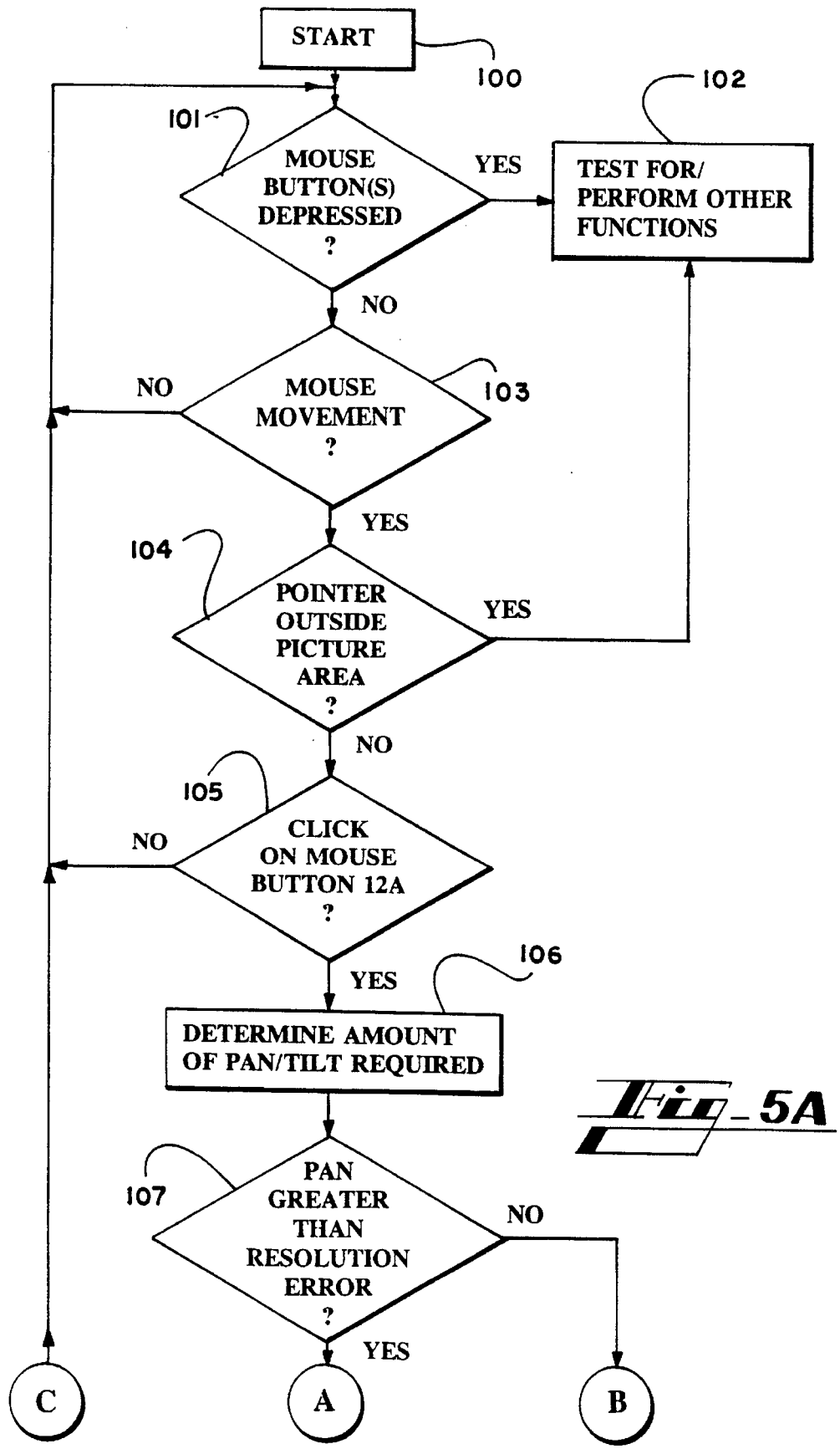
FIGS. 5A and 5B are a flow chart of the method used for positioning a camera.
Figure 5B:
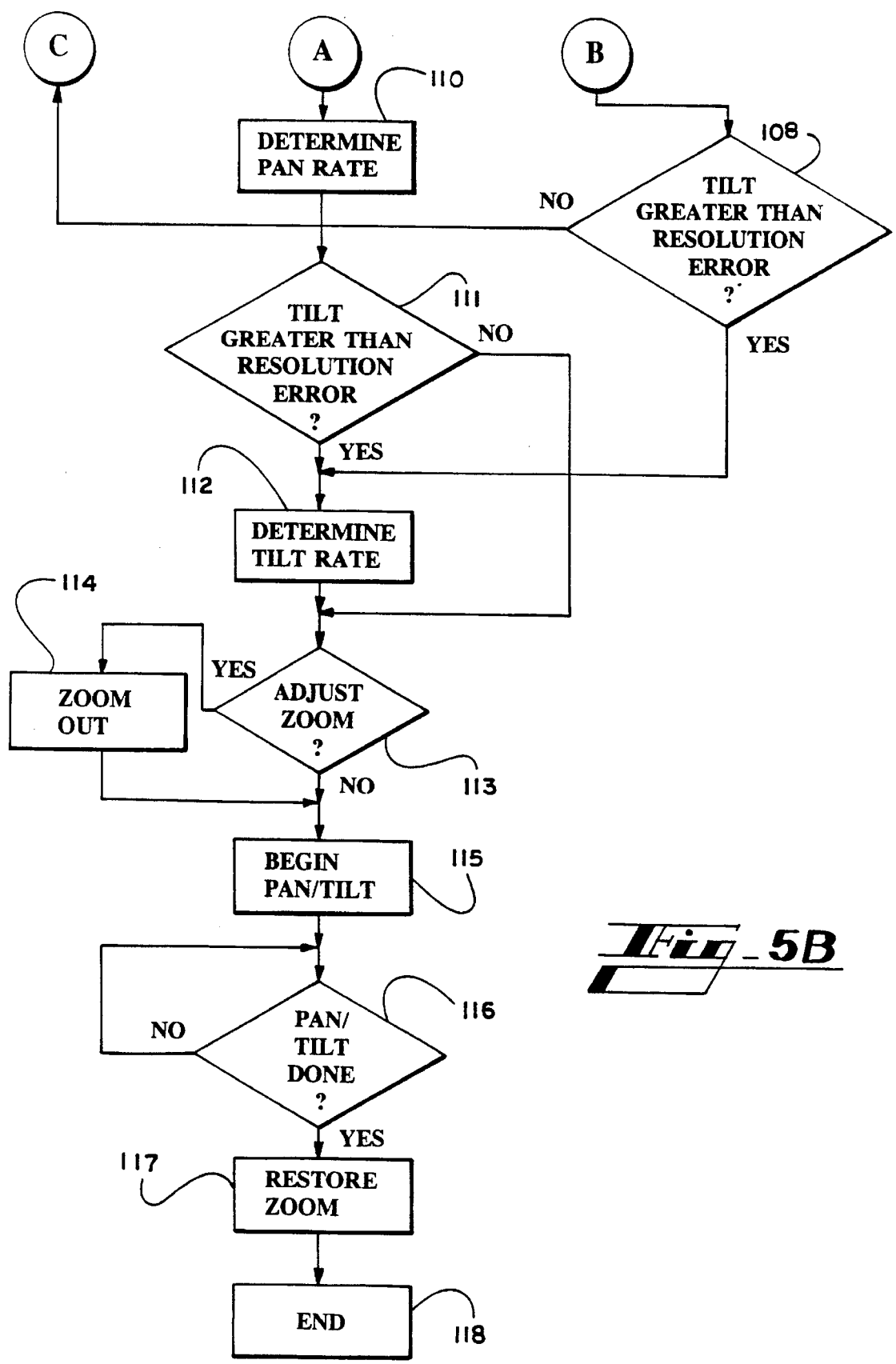

FIGS. 5A and 5B are a flow chart of the method used for positioning a camera. In the preferred embodiment, the mouse 12 or the joystick 18 may be used to move a pointer within the display presented on a monitor, such as monitor 21A. For convenience, only the operation using mouse 12 will be discussed although it will be appreciated that joystick 18, with control buttons thereon, can be used to accomplish the same result. This particular method of positioning the camera is referred to herein as "point-and-click". This phrase describes the action required by the user to reposition the camera. That is, using mouse 12, the user causes the pointer to be positioned (pointed) over the target of interest and then clicks a button on mouse 12. Controller 10 then causes the selected camera to be aimed at the selected point so that the selected point is nominally in the center of the screen display seen by the user. This allows the user to quickly and easily designate where a selected camera should be pointing so that the user can conveniently view the desired object(s). It should be noted that this method is useful for both local cameras, that is, cameras which are at the same site as the user, and for remote cameras, that is, cameras which are at the remote site. Therefore, the user can easily adjust the remote camera to point at a desired object. This allows the user to focus a camera on a target of interest without having to instruct the person at the other end to stop whatever he or she is doing and position the camera as desired by the user.

This procedure is preferably implemented by controller 10. A starting step 100 is shown but it will be appreciated that controller 10 performs many operations and therefore a starting step should be understood to be an entry point into a subroutine, such as a subroutine used for camera positioning. In decision 101 a test is made as to whether any mouse button 12A, 12B is depressed. If so then the user is indicating that some function other than point-and-click camera positioning is to be performed and therefore other functions are tested and/or performed in step 102. If no mouse buttons are depressed then, in decision 103, a test is made for movement of the mouse. If there is no mouse movement then a return is made to decision 101. If there is mouse movement then decision 104 tests whether the pointer displayed on the screen of monitor 21A is outside the area of the monitor designated for the picture. That is, is the pointer now positioned over a control bar, selection icon, other function symbol, a different picture (picture-within-picture), or a different monitor. If the pointer is outside the picture area then the user is indicating that other functions are to be performed and controller 10 proceeds to step 102 to perform the other functions. If the pointer is within the picture area then decision 105 tests whether a mouse button, such as mouse button 12A, has been clicked. If not then a return is made to decision 101. If so then controller 10 determines in step 106 the amount of pan and tilt required to achieve the user's request. This is determined by measuring the click position of the mouse with respect to the center of the screen, and the amount of zoom presently employed. Decision 107 tests whether the amount of pan required is greater than the resolution error of the pan mechanism. That is, if the amount of pan required is one degree but the pan mechanism has a resolution error of two degrees, then panning should not be done. If panning is not to be done then decision 108 is executed. Decision 108 tests whether the tilt required is greater than the resolution error of the tilt mechanism. If the tilt required is not greater than the resolution error then a return is made to decision 101 because it has been determined that neither pan nor tilt is required. If, in decision 108, the tilt required is greater than the resolution error then step 112 is executed next. Referring back to decision 107, if the pan required is greater than the resolution error then, in step 110, the pan rate is determined. Then, in decision 111, a test is made as to whether the tilt is greater than the resolution error. If not then step 113 is executed next. However, if the tilt is greater than the resolution error then the tilt rate is determined in step 112.

Although this process causes the movement along both axes to be completed at the same time, an undesirable affect may occur when moving long distances, such as from one preset location to another when the field of view is narrow. Assume, for example, that the field of view is 6 degrees, and the pan angle will be 60 degrees. If the pan rate is selected to cause the object to move across the field of view (6 degrees) in time T, then it will take 10 T seconds for the camera to reach its destination. However, if the pan rate is selected to cause the camera to traverse the full distance in T seconds, then the 6 degree field of view will cause objects to fly across the scene in a blur. Therefore, in the preferred embodiment, if the camera is to pan over a long distance the camera is zoomed out (and focused accordingly) so that the camera has a wide field of view. The high speed pan rate will then allow the movement from start to finish to occur in a timely manner but, because the camera is zoomed out, an object will be reduced in size and will move at an acceptable rate across the display screen. At the end of the pan operation the camera is zoomed in (and focused accordingly) as specified by the destination location.

Therefore, in decision 113, controller 10 determines whether the pan distance is sufficiently large to require zooming out. If not then step 115 is executed. If so then the camera is zoomed out and then step 115 is executed.

In step 115 pan, tilt, and/or zoom, as required, are begun.

Decision 116 tests whether the pan/tilt operation has been completed. If not then a return is made to decision 116. If the operation is complete then the zoom and focus are restored in step 117, if necessary, and the process of camera movement is ended in step 118.

The rate of pan and tilt are determined by considering the desired number of seconds that it should take an object to move from one end of the field of view to the other end of the field of view. In the preferred embodiment, this setting is programmable at controller 10. The display is considered to have a 2×3 aspect ratio (V to H). If it is desired that the object remain within the field of view for, for example, two seconds, and the field of view is, for example, 30 degrees, the pan speed will be set to 15 degrees per second and the tilt speed will be set to 10 degrees per second. By synchronizing the movements of the pan and tilt mechanisms in this manner the camera will reach the desired position, with respect to both axes, at approximately the same time. This has the desirable effect of making the camera positioning appear smooth. Otherwise, the camera may reach the desired position with respect to one axis first, for example the vertical axis, and then have to continue moving with respect to the other axis until the desired location is achieved, which makes the camera movement appear awkward.

The point-and-click method of camera control is a major improvement over existing button methods of camera control. However, if the field of view is narrow, it may take several point-and-click operations to pan the camera from one position to another position. Therefore, rather than follow the pointer movement only in discrete increments when the mouse button is clicked, the present invention provides an alternative form of movement. If this alternative form is selected by the user, such as by using a pull down menu or by pressing on a different mouse button such as button 12B, the camera will dynamically follow the pointer. In this case, if the pointer is moved slowly toward the side of the display controller 10 would cause the camera to slowly pan toward that side. When the pointer is positioned all the way to the side of the display, or at some predetermined border point, controller 10 instructs the pan/tilt unit to move at its maximum speed. Controller 10 automatically zooms out the camera when panning at high speed and automatically zooms in the camera to its original setting when the pointer is no longer at the side of the display and the pan speed is dropped to a slower rate. Of course, the user can adjust the zoom at any time.

FIGS. 6A and 6B are an illustration of the operation of the automatic zoom ("draw-and-release") feature of the present invention. FIG. 6A is an illustration of a monitor 21 having a screen 125, which is displaying a person 126 sitting at the end of a table 127. Assume now that the user wishes to focus on the person 126. Using a conventional system the user could adjust the pan and tilt controls and then adjust the zoom and focus controls so as to zoom in on person 126. However, using the present invention the user will simply use the mouse 12 to place the pointer at the desired pointer starting point (PSP), depress and hold a predetermined mouse button, such as the left button 12A, and drag the pointer across the area of interest, which causes a rectangular box to begin spreading across the screen, with one corner at the PSP. When the user reaches the desired ending point, the pointer ending point (PEP), the user will release the mouse button. The user has thereby drawn a rectangle around the area of interest and released the mouse button. Controller 10 will then determine the appropriate pan and tilt for a camera and cause the camera to center its field of view on the center of the rectangle (CR), then cause the camera to zoom in so that rectangle 128 fills, as fully as possible, screen 125, and also cause the camera to refocus, if necessary. The resultant display is seen in FIG. 6B, which illustrates that the camera has been repositioned so that CR is now in the middle of the display (MD). Therefore, by the simple tasks of positioning the pointer in one corner of the desired scene, depressing a mouse button, dragging the mouse to draw a rectangle, and releasing the mouse button, the user has caused the selected picture area to be expanded to fill the display 125. The use of point, click, drag, and release techniques to draw a box, such as box 128, are, in general, well known in the personal computer field.

FIG. 7 is a flow chart of the method for controlling the aim point and the zoom operation of the camera. Upon starting 130, controller 10 tests, at decision 131 whether the appropriate mouse button has been depressed. If not then, in step 132, controller 10 tests for and/or performs other functions. If the mouse button has been depressed then, in step 133, controller 10 records the initial pointer position PSP. Then, in decision 134, controller 10 tests whether the mouse button has been released. If the mouse button has not been released then the user has not completed drawing the desired rectangle 128. Once the mouse button is released then the user has completed drawing rectangle 128 and has therefore designated the area of interest. Controller 10 therefore proceeds to step 135 and performs the following operations. First, the final pointer position PEP is recorded. Then the midpoint CR of the drawing rectangle 128 is calculated based upon the initial and final pointer positions PSP and PEP. Controller 10 then calculates the difference between the midpoint CR of rectangle 128 and the midpoint MD of display 125. These steps determine the pan and tilt required to center the desired picture on screen 125 and, although performed automatically, are analogous to the user moving the pointer to position CR and then clicking on the mouse, as in the procedure described with respect to FIG. 5. Controller 10 then performs steps 106 through 117 of FIG. 5 except that the "No" output of decision 108 does not return to step 101 but moves to substep 5 of step 135. The results of substeps 1–4 of step 135 is that controller 10 has caused the camera to pan and tilt so as to place the center CR of rectangle 128 at the midpoint MD of display 125. However, controller 10 must still determine how much zoom is required to satisfy the request of the user. Therefore, controller 10 determines the X-axis movement XM of the pointer and the Y-axis movement YM of the pointer. Controller 10 then adds the X-axis movement and the Y-axis movement to obtain the total movement of the pointer. Controller 10 then determines the ratio of the total movement (XM+YM) to the total size (XD+YD) of the screen 125 of monitor 21. Controller 10 then determines a new field of view by multiplying the above ratio times the current field of view. It will be appreciated that the current field of view is information which may be obtained from the zoom mechanism on the camera. Controller 10 then causes the camera to zoom to the new field of view or, if the new field of view is less than the minimum field of view supported by that camera, to zoom to the minimum field of view supported. Controller 10 then instructs the camera to focus, either by an auto focus process or by a memory process such as described below, and then the procedure ends.

The rectangle 128 illustrated in connection with FIG. 6A has XM and YM proportions such that zooming in will cause rectangle 128 to nicely fill screen 125. However, it will be appreciated that the user may not always draw such a well proportioned rectangle. The user may draw a rectangle which is very wide and has minimal height or is very tall but has minimal width. In such a case, due to limitations imposed by the shape of screen 125, it is not possible to expand the picture as desired by the user. Therefore, an alternative process must be followed. One possible alternative approach is to expand rectangle 128 so that the larger of XM and YM is used to determine the zoom required. This approach will display to the user all of the area encompassed by rectangle 128 as well as some picture area outside of rectangle 128, as necessary to fill up screen 125. In another alternative approach, the smaller of XM and YM is used to determine the amount of zoom required. In this case the smaller measurement is expanded to fill up screen 125 and some of the area of rectangle 128 encompassed by the larger dimension of rectangle 128 will exceeds the limits of screen 125 and therefore will not be shown to the user.

Audio and Video Control Nodes

Figure 8:
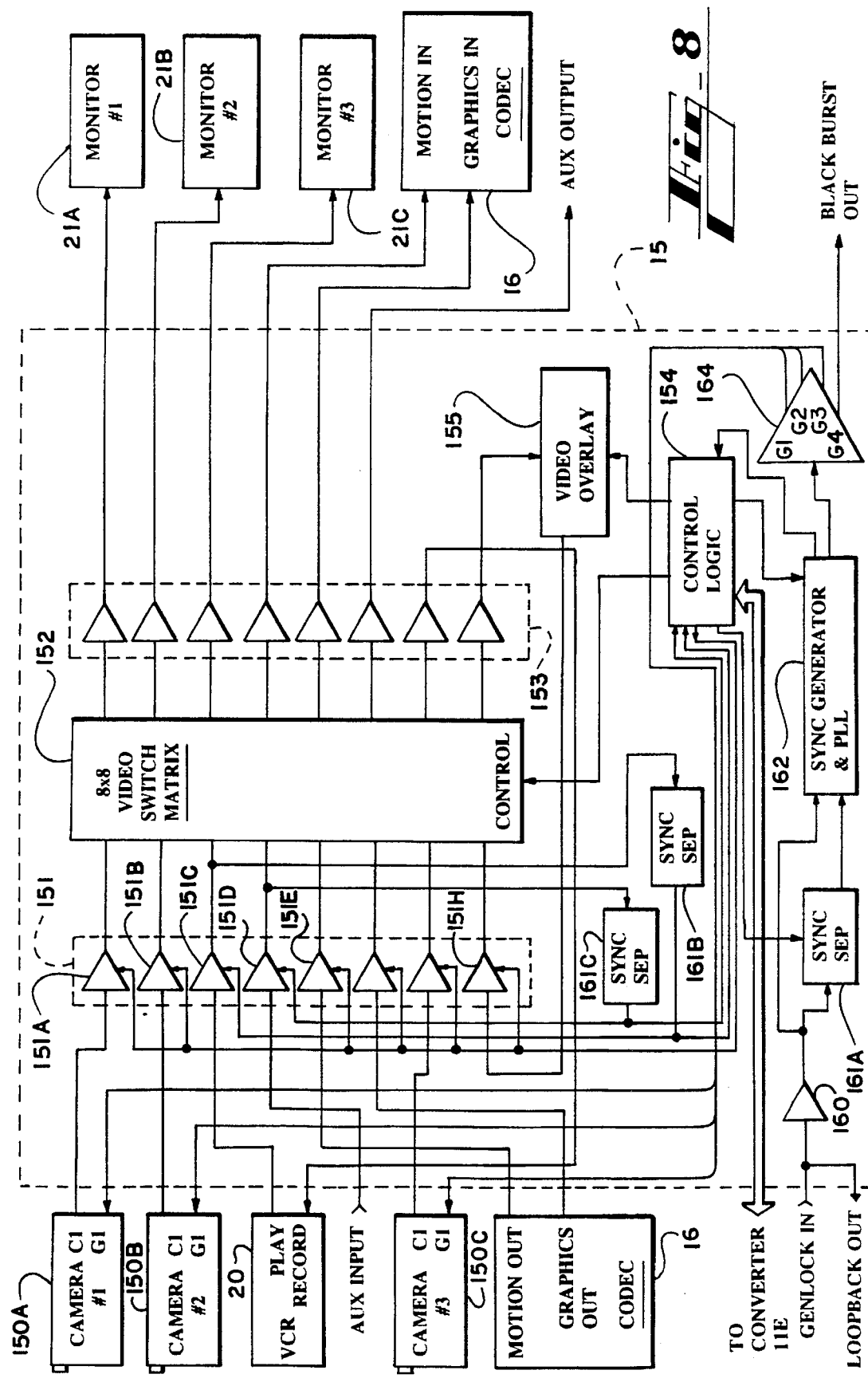
FIG. 8 is a schematic block diagram of a video unit control node.

FIG. 8 is a schematic block diagram of a video unit control node 15. In the example shown, video unit control 15 is connected to three cameras 150A–150C, three monitors 21A–21C, and a VCR 20. It should be understood that the number of cameras, monitors and VCRs is a design choice and is limited only by the video switching capability of node 15, which is primarily determined by cost considerations. Video unit control node 15 selectively routes video signals from cameras 150, VCR 20, codec 16 and the auxiliary input, to monitors 21, codec 16, VCR 20 and the auxiliary output. As is well known in the art, codec 16 has a motion input and a motion output, for scenes which frequently change, and a graphics input and a graphics output for scenes which infrequently change, such as slides and graphs.

Video unit control node 15 comprises a plurality of video input buffers 151 designated generally as 151, which are connected to the inputs of an 8×8 video switch matrix 152, which is connected to a plurality of output buffers designated generally as 153, a control logic 154, a video overlay device 155, a sync generator input lock signal buffer 160, a plurality of sync separators 161A–161C, a sync generator and phase locked loop (PLL) circuit 162, and a black burst output distribution amplifier 164. Buffers 151, which also perform DC restoration to the input signal, and buffers 153 buffer the incoming and outgoing video signals in a conventional manner. Likewise, switch matrix 152 switches the input signals from cameras 150, VCR 20, codec 16, the video overlay circuit 155, and the auxiliary input to the desired destination device, such as monitors 21, codec 16, VCR 20, and the video overlay circuit 155. Control logic 154 is connected between converter 11E and switch matrix 152. As will be recalled from a reading of the operation of the system in conjunction with FIG. 1, converter 11E extracts signals from network 23 which are intended for video control node 15 and converts the signals into the proper format for control node 15. Control logic 154 accepts the signals from converter 11E and sends corresponding control signals to switch matrix 152, sync generator and PLL circuit 160, and video overlay circuit 155.

Sync generator input lock signal buffer 160 has an input connected to a Genlock input signal, and an output connected to a sync separator 161A. Sync separator 161A, in a well known manner, recovers and separates the vertical synchronization signals from the horizontal synchronization signals. The output of buffer 160 and the output of sync separator 161A are connected to inputs of sync generator and PLL circuit 162. Circuit 162 provides a black burst output which is synchronized to the selected input signal. For NTSC signals the output of buffer 160 is used as the sync source, for PAL signals the output of sync separator 161A is used as the sync source. Control logic 154 directs circuit 162 as to which input signal should be used for synchronization.

The outputs of buffers 151C and 15 1D are connected to the inputs of sync separator circuits 161B and 161C, respectively. The outputs of circuits 161B and 161C are connected back to inputs of buffers 151C and 151D, respectively, so that DC restoration is performed based upon the actual input signal. In a similar manner, the outputs of buffers 151A, 151B, and 151E–151H could be provided to sync separator circuits, and the outputs of the sync separation circuits routed back to their respective buffers. However, in the preferred embodiment, to reduce costs, control logic 154 provides a sync signal to these buffers for DC restoration. The sync signal provided by control logic 154 is preferably the sync signal provided by sync generator and PLL circuit 162. Buffers 151A, 151B, and 151E–151H are preferably used as inputs from devices, such as cameras, which can be synchronized to an external source. Buffers 151C and 151D are preferably used as inputs from devices, such as VCR's, which typically cannot be synchronized to an external source. Therefore, for devices which can be synchronized, DC restoration is performed based upon a master (Genlock) sync signal and, for devices which cannot be synchronized, DC restoration is performed based upon the sync signal from that device.

One output of sync generator and PLL circuit 162 is connected to an input of control logic 154. This allows control logic 154 to determine the start of a video frame or the start of a line so that video switching occurs at the proper place in a picture. Also, some codecs require information as to the vertical interval within which switching is to occur and control logic 154 uses the signal from sync circuit 162 to provide this information as well. The output of circuit 162 is connected to the input of a distribution amplifier 164 which provides several outputs G1–G4, which are black burst generator lock outputs. These outputs are used to synchronize cameras 150 so that the pictures from all cameras 150 are in sync.

Video overlay circuit 155 is used to provide special video effects such as picture within picture, and superimposed graphics and icons. Video overlay circuit 155 may be part of control node 15, part of controller 10, or an independent device.

The auxiliary input is used to provide graphical user interface (GUI) information such as video icons, control "buttons" on the monitor display, control borders and pointers, etc. In the preferred embodiment, this information is generated by controller 10. Methods of generating GUI information are well known to those of ordinary skill in the art.

FIG. 9 is a schematic block diagram of an audio unit control node 14. Control node 14 selectively routes audio signals from various sources to various destinations. In the preferred embodiment, by way of example, audio inputs are from an auxiliary input, left and right channel inputs from VCR 20, microphones 174A–174D, a telephone connection, and the audio output of codec 16. Destinations for audio signals are, again by way of example, the record input of VCR 20, a telephone connection, and the audio input of codec 16. Any input audio signal may be routed to any desired destination and, likewise, any destination may receive any selected audio input signal. It will be appreciated that, with respect to the telephone line (TELCO) connection, additional circuitry, which is not shown, will be required to comply with FCC regulations regarding connection of devices to telephone lines and also to separate the combined input/output signal on the telephone line into input signals and output signals. Methods and devices for interfacing with the telephone line to accomplish line this are well known to those of ordinary skill in the art.

All input and all output signals are buffered, either by a plurality of buffers/amplifiers designated generally as 173 or a mixing circuit 172. The auxiliary input, the TELCO input, and the inputs from microphones 174A–174D are buffered by buffers/amplifiers 173A–173C, respectively. Likewise, the input from codec 16 is buffered by buffer/amplifier 173E. The inputs from VCR 20 are buffered by mixer 172A. The auxiliary input, the VCR 20 inputs, the TELCO input, the microphones 174A–174D inputs, and the codec 16 audio output are each passed through a muting circuit 170A–170E, respectively, and also through a gain control circuit 171A–171H, respectively. The auxiliary input, VCR input, and TELCO input are then provided to a plurality of mixers designated generally as 172C. Mixers 172C contain separate mixers for the output to VCR 20, the output to the TELCO, and the output to the audio input of codec 16. However, in the preferred embodiment, the inputs from microphones 174 are routed to a digital signal processing echo canceller 176. The output of echo canceller 176 is then routed to the mixers 172C. The outputs of three of the mixers of 172C are routed through gain control circuits 171I–171K and buffers/amplifiers 173E before being provided to VCR 20, the TELCO connection, and the audio input of codec 16. The audio output from codec 16 is routed through a gain control circuit 171H, a mute control circuit 170E, and then to the mixers 172C. The output of the fourth mixer of mixers 172C is routed to the received input of echo canceller 176. The received output of echo canceller 176 is routed through mute circuit 170F, gain control circuit 171L, and amplifier 173D, before being routed to speaker 175.

In the preferred embodiment, a mute circuit 170 comprises, as shown by mute circuit 170A, an analog switch. The mute circuits 170 are controlled by control logic 177. Likewise, in the preferred embodiment, gain control circuits 171, such as gain control 171A, are digitally controlled gain circuits, and are controlled by control logic 177.

In the preferred embodiment, the user can use mouse 12 to pull down a menu and select a particular input or output device, and then select the gain or muting desired for that particular device. As previously mentioned, the signals from mouse 12 are provided by converter 11B to controller 10. Controller 10 interprets the mouse signals to determine the action requested by the user and, in this case, sends appropriate gain and mute signals to converter 11D. Converter 11D extracts this information from network 11 and sends the appropriate control signals to control logic 177 which, in turn, supplies the appropriate signals to the gain circuits 171 and the mute circuits 170.

As is well known in the art, some form of echo suppression or cancellation is generally desired and, in the preferred embodiment, echo canceller 176 is an echo cancellation card manufactured by Gentner Communications Corporation, Salt Lake City, Utah. Echoes are typically caused by feedback between a speaker 175 and microphones 174 in a room, and is made more noticeable and distracting by the time delay caused by codec 16 and the additional delay which occurs when the signal is transmitted via satellite.

Camera Focusing

The present invention allows the selection of the camera focus to be controlled by the position of the camera. This feature establishes a database of the room layout and, when the user clicks and/or zooms in on a region the database is consulted to determine the focus settings and the database focus setting is automatically applied to the camera. If the selected objected is slightly out of focus the user will then adjust the focus setting manually. When the user manually adjusts the focus setting the region of the object and/or the appropriate focus setting are added to the database. Of course, it is quite likely that a user will not position a pointer in exactly the same place on the selected object or adjust the zoom to precisely the same degree every time. Therefore, the pan position, tilt position, and field of view angle may vary slightly from time to time, even though the user is designating the same object. In order to prevent the database from unnecessarily expanding and to reduce processing time in searching the database, the present invention uses regions, rather than pixels, to determine if the user has selected the same target. The database therefore consists of a tree of regions. A region is defined as a viewing area seen by a camera and is identified by a polar coordinate system which specifies a pan position, a tilt position, and a camera field of view angle. FIGS. 10A–10C are illustrations of the relationship between regions. Two regions are considered to match, or be the same region, if the intersection of the regions contains a certain percentage of each region, as shown in FIG. 10A. In the preferred embodiment, this percentage is programmable and the default setting is 80%. If a selected region does not match a prerecorded region (FIG. 10B) then the focus setting for that new region is obtained from its closest parent region. A parent region is a region which completely encompasses another region, as shown in FIG. 10B. A parent region may be encompassed within another, larger region, and therefore one parent region may be the child of another parent region, as shown in FIG. 10C. At the limit, in the preferred embodiment there is a master parent region, which is a parent to all regions, and is the default focus setting. There is no fixed limit on the number of regions that may be stored in the database. However, in the preferred embodiment, a programmable limit on the number of regions is used and regions are discarded on a least recently used basis when necessary to accommodate the storage of settings for a new region. The present invention therefore allows the videoconferencing system (controller 10) to learn and remember the focus settings for the room and different objects within the room, and to dynamically adapt to changing room configuration and user preferences. FIGS. 10A–10C illustrate the relationship between fields.

Turn now to FIGS. 11A and 11B which are a flow chart of the camera focusing process of the present invention. FIG. 11A is entered whenever there is a change in the pan, tilt, zoom or focus settings of the camera. In step 201 controller 10 determines the polar region based upon the pan position, the tilt position, and the field of view angle (zoom setting). In decision 202 a determination is made as to whether the polar region is in the database. If so then in step 203 the focus setting is obtained from the matching polar region in the database and then step 205 is executed. If the polar region is not in the database then, in step 204, the focus setting is obtained for a parent region in the database and the step 205 is executed. It will be appreciated at this point that if there is a matching polar region then the focus setting will be extremely close to the desired focus setting. If there is not a matching polar region then by the use of parent regions, a focus setting is obtained which may be adequate or which will allow the user to easily fine tune the focus setting. In step 205 controller 10 sends signals to converter 11G and control node 17 to adjust the focus of the selected camera. Also, the start time for that focus setting is recorded. This start time is used in step 215 below. Decision 206 determines whether a new region has been selected, such as by point and click, draw-and-release, manual controls, etc. If so then a return is made to step 201. If not then decision 207 tests whether the user has adjusted the focus since it was set in step 205. If not then a return is made to decision 206. If the user has adjusted the focus then, in step 210, controller 10 sends signals which cause the focus to be adjusted according to the user's instructions and records the focus setting start time. In decision 211 controller 10 determines whether the current polar region is in the database. If so then controller 10 adjusts the focus setting in the database to correspond to the focus setting actually selected by the user and then returns to decision 206. By this process the focus for a particular polar region is made to conform to the user's particular desires. If the polar region is not in the database then decision 213 tests whether the database is full. If not then controller 10 adds the new polar region and the focus settings to the database and returns to decision 206. However, if the database is full then, in step 215, controller 10 searches the database for the least important region and discards that region. In the preferred embodiment, the least recently used region is deemed to be the least important region and is discarded. Of course, this is a desire preference and other criteria could be used to determine which region is to be discarded, such as: the least frequently used regions, regions which encompass a certain percentage of a parent region, a region which matches another region, etc. After the least important region is discarded then controller 10 adds the new region and focus setting to the database in step 214.

Therefore, by the above process, the camera is automatically focused on the target selected by the user and, if the selected focus setting is unsatisfactory to the user and the user adjusts the focus setting then the user's selected focus setting is stored for use and is used the next time that the user selects that region.

Camera Construction

Figure 12A:
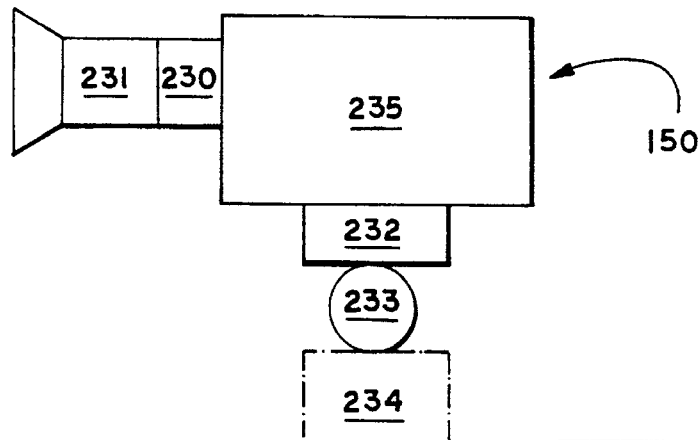
FIG. 12A is an illustration of the preferred embodiment of a camera of the present invention.

FIG. 12A is an illustration of the preferred embodiment of a camera 150 of the present invention. Camera 150 has a camera body 235, a focusing lens system 230, a zoom/field of view lens system 231, a panning system 232, a tilt system 233, and a camera base 234. The design of focusing systems, zoom systems, panning systems, and tilt systems, and cameras themselves, are well known in the art. In the preferred embodiment, rather than systems 230–233 operating open loop with controller 10, the systems provide feedback to controller 10 so that controller 10 can evaluate the response of the system to the instruction sent.

Figure 12B:
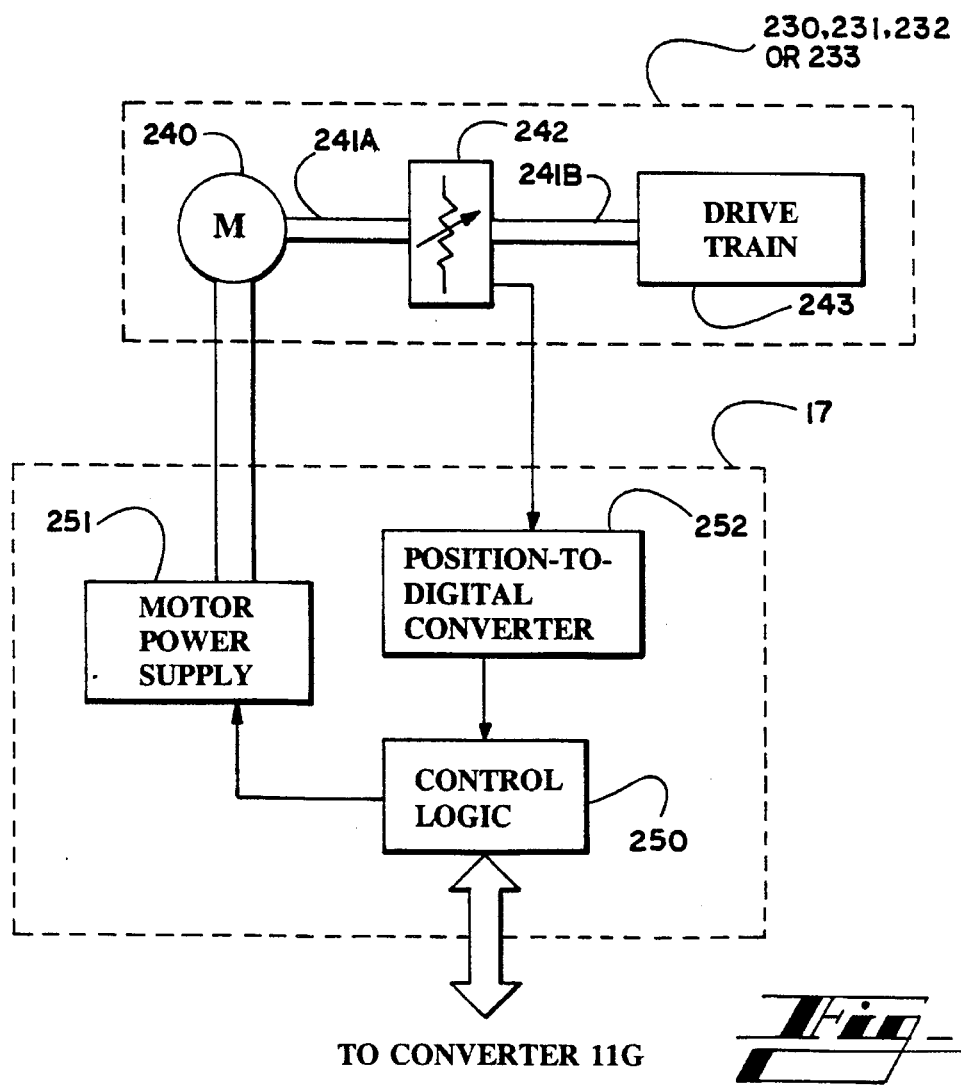
FIG. 12B is an illustration of the feedback system associated with the camera controls.

FIG. 12B is an illustration of the feedback system associated with the camera controls: systems 230–233, and control node 17. A feedback unit, which is part of systems 230–233, comprises a drive motor 240, a drive shaft 241, a position sensing means 242, and a drive train 243. Position sensing means 242 may be a variable resistor, a potentiometer, a digital shaft position encoder, etc. Drive train 243 drives the appropriate focusing, zooming, panning or tilting function. Systems 230–233 are connected to camera unit control node 17. Control node 17 comprises control logic 250, a motor power supply 251, and a position-to-digital converter 252. Assume that the user indicates that a selected camera should pan to the left. Controller 10 will send the appropriate instructions to converter 11G which, in turn, will transfer the instructions to control logic 250 of control node 17. Control logic 250 will, in turn, cause motor power supply 251 to apply the appropriate voltage to motor 240 to cause motor 240 to turn in the direction which, via drive shaft 241 and drive train 243, causes camera 150 to pan to the left. As draft shaft 241 rotates it changes the resistance of the positioning sensing means 242. The position-to-digital converter 252 converts the change in resistance to digital signals and provides these digital signals to control logic 250. In one embodiment, control logic 250 may close the loop and control motor power supply 251 so as to achieve the pan position specified by controller 10. In another embodiment control logic 250 sends the current pan position back to controller 10 and controller 10 determines whether the camera 150 has reached the desired position. Depending upon the particular motor used, control of motor 240 may be effected by the voltage, the pulse width, and/or the polarity of the voltage provided by motor power supply 251, which is controlled by control logic 250. Position-to-digital converter 252 may directly measure the resistance of a potentiometer in position sensing means 242, may apply a voltage across a potentiometer in position sensing means 242 and measure the output voltage from the potentiometer, or use other means, such as digital shaft position encoding techniques. The means of sensing the position is not critical but should be accurate enough to provide the degree of control necessary to satisfy the user. In the preferred embodiment, a pan position resolution of 0.1 degrees, a tilt position resolution of 0.1 degrees, and a field of view resolution of 0.03 degrees is used. The position sensing mechanism 242 may be a factory installed part of a system 230–233 or may be a retrofit. In the preferred embodiment, a camera 150 is a Hitachi CCD color camera model KB-C550, manufactured by Hitachi Denshi America, Woodbury, N.Y., and the lens is a Rainbow Automatic Iris electrically driven zoom lens model H6X8MEA-II, manufactured by International Space Optics, Huntington Beach, Calif.

For clarity of illustration, FIG. 1 illustrates only a single camera unit control node 17. However, in the preferred embodiment, there is a separate camera unit control node 17 and a separate converter 11G associated with each camera so that a camera 150 may be attached or removed from the system by connecting and disconnecting a minimum number of wires and cables. Although FIG. 12B illustrates a separate motor power supply 251, position-to-digital converter 252, and control logic 250 for each system 230–233, the present invention is not so limited. If the motors 240 for the different systems 230–233 are of a similar type then a single motor power supply 251 may be used to control all the motors. Further, the changing of a setting, such as pan, tilt, focus and zoom, occurs at a relatively slow rate compared with other system operations. Therefore, it is possible to multiplex the outputs of several position sensing means 242 into a single position-to-digital converter 252, thereby reducing costs. Control logic 250 selects the appropriate position sensing means 242 in accordance with the motor 240 of the system 230 that is being driven and needs to be monitored. In this manner, a single control logic circuit 250, motor power supply 251, and position-to-digital converter 252, combined with a multiplexer (not shown), may be employed to service two or more systems 230–233.

Multiple Monitor Systems

FIG. 13 is an illustration of a two-monitor videoconferencing system of the present invention. In the illustration, there are two monitors 21A, which depicts the scene seen by the local camera, and monitor 21B which depicts the scene seen by the remote camera. The local camera is showing a desk 300 with two persons 301 and 302, one of which is typically the user. Monitor 21B shows the remote scene which has a person 304 sitting at a desk or table 303. Monitor 21A also shows a control bar 270. It will be noted that person 304 is not centered in the display on monitor 21B but that the user wishes person 304 to be centered. The user will use mouse 12 to move cursor 280 to control bar 270 and pull down a camera selection menu 271. In one embodiment the menu will pull down by simply moving the cursor over the appropriate position on the control bar and, in another embodiment, the menu will be pulled down if the user positions the pointer over the appropriate position on the control bar and depresses or clicks a button 12A, 12B on mouse 12. Methods for pulling down menus are well known in the personal computer field. Camera menu 271 lists the available cameras such as a local camera, a remote camera, and a graphics camera. In this case the user wishes to select the remote camera so the user will click on the appropriate spot 272 of menu 271 to select the remote camera. This will cause a second menu 273 to pull down listing the functions that can be performed with that camera, such as pan left/right, tilt up/down, zoom in/out, and focus. In this case the user wishes to move person 304 to the center of monitor 21B and decides to first pan the camera to center 304. The user will therefore select the panning function 274. This will cause a pan control icon 275 to appear on monitor 21B. Icon 275 shows arrows to allow the user to specify movement of the camera to the right 276 or to the left 277. The user will therefore position pointer 280 over the appropriate arrow and click and hold a mouse button 12A or 12B until the desired position of person 304 has been achieved. At that point the user can go back to menu 273 to select tilt and adjust the tilt position as desired, as well as the zoom and focus. Alternatively, the user could simply use point-and-click technique described above. That is, place pointer 280 in the middle of person 304 and click thereon, thereby causing controller 10 to automatically position person 304 in the center of monitor 21B. Also, the user could use the draw-and-release technique described above to cause person 304 to be centered in monitor 21B.

Although the control bar 270 and menus 271 and 273 are show in monitor 21A and the icon 275 is shown in monitor 21B it will be appreciated that this is merely a design choice and that the control bar, menus, and icons may be displayed on either monitor and, if desired, can be moved, using control bar 270, from one monitor to the other. Mouse 12 is preferably used to move pointer 280 between the displays of monitors 21A and 21B. The movement of a cursor or pointer between screens is well known in the personal computer field.

In the preferred embodiment, controller 10 also supports operation with picture-within-picture, split-screen, and four-quadrant picture operation. In these cases controller 10 controls, and therefore knows, the switching point between one picture and the next and therefore is able to determine whether the pointer is over a scene controlled by a first camera, a second camera, or even a remote camera. Monitor 21B illustrates a picture 281 within the broader picture illustrated. In this illustration, picture 281 is a view of a graph 282. The user could therefore position cursor 280 over picture 281 and controller 10 would know that the subsequent user actions were directed to picture 281 and not directed to the larger picture depicting user 304. If the picture 281 were being generated by a remote camera then controller 10 would send network standard signals corresponding to the desired action to the remote controller, which would cause the remote camera to take the desired action.

The source of the picture 281 may be any camera which is selectable. The video unit control node 15 is programmed by controller 10 to dynamically connect the appropriate video signals between the appropriate devices so that picture-within-picture and other types of pictures may be obtained. Methods for achieving various multiple picture presentations are well known in the television broadcasting field.

Other embodiments of the present invention will become apparent to those of skill in the art after a reading of the detailed description above and an inspection of the accompanying drawing figures. Therefore, the scope of the present invention is to be limited only by the claims below.

We claim:

1. A videoconferencing system with error detection, comprising:
   a camera for providing a picture, said camera including a zoom mechanism and a focus mechanism;
   a pan and tilt mechanism for pointing said camera to a desired position;
   a zoom position indicator tier providing a zoom status signal;
   a focus position indicator for providing a focus status signal;
   a pan position indicator for providing a pan status signal;
   a tilt position indicator for providing a tilt status signal;
   a monitor for displaying said picture;
   means for providing zoom and focus commands to said camera, for providing pan and tilt commands to said pan and tilt mechanism, for monitoring said zoom status signal, said focus status signal, said pan status signal, and said tilt status signal to determine whether said commands were properly executed, for determining that an error has occurred if any of said commands were not properly executed, for providing an error detection signal if a said error has occurred and for maintaining a record of said error and an indication of the command associated with said error.

2. The videoconferencing system of claim 1 and further comprising a modem tier connecting said means to a telephone line and wherein said means provides a notice of said error and said indication of the command associated with said error via said modem to a remote location.

3. The videoconferencing system of claim 2 wherein said means automatically provides said notice of said error and said indication of the command associated with said error upon determining that said error has occurred.

4. The videoconferencing system of claim 2 wherein said means provides said notice of said error and said indication of the command associated with said error in response to said remote location calling into said modem.

5. The videoconferencing system of claim 1 wherein said means, upon determining that said error has occurred, identifies a command associated with said error and provides a second command, said second command specifying a function which is reverse to said function specified by said command associated with said error.

6. The videoconferencing system of claim 5 wherein said means monitors said status signals to determine whether said second command was properly executed.

7. The videoconferencing system of claim 6 wherein said means provides a first said error detection signal if said second command was properly executed and provides a second said error detection signal if said second command was not properly executed.

8. The videoconferencing system of claim 6 wherein, if said second command was properly executed, said means again sends said command associated with said error and monitors said status signals to determine whether said command associated with said error was properly executed.

9. The videoconferencing system of claim 8 wherein said means provides a first said error detection signal if said command which was sent again was properly executed and provides a second said error detection signal if said command which was sent again was not properly executed.

10. A videoconferencing system with error detection, comprising:
    a camera tier providing a picture;
    a monitor for displaying said picture; and
    a transmitter responsive to a command signal for sending an infrared control signal to said monitor;
    a detector for providing a monitor status signal in response to detecting a response from said monitor to said infrared control signal; and
    means for sending said command signal to said transmitter, for monitoring said monitor status signal to determine whether said command was properly executed by said monitor, for determining that an error has occurred if said command was not properly executed by said monitor, and for providing an error detection signal if said error has occurred.

11. The videoconferencing system of claim 10 and further comprising a modem for connecting said means to a telephone line and wherein said means provides a notice of said error and said indication of the command associated with said error via said modem to a remote location.

12. The videoconferencing system of claim 11 wherein said means automatically provides said notice of said error and said indication of the command associated with said error upon determining that said error has occurred.

13. The videoconferencing system of claim 11 wherein said means provides said notice of said error and said indication of the command associated with said error in response to said remote location calling into said modem.

14. The videoconferencing system of claim 10 wherein said means, upon determining that said error has occurred, identifies a command associated with said error and provides a second command, said second command specifying a function which is reverse to said function specified by said command associated with said error.

15. The videoconferencing system of claim 14 wherein said means monitors said status signal to determine whether said second command was properly executed.

16. The videoconferencing system of claim 15 wherein said means provides a first said error detection signal if said second command was properly executed and provides a second said error detection signal if said second command was not properly executed.

17. The videoconferencing system of claim 15 wherein, if said second command was properly executed, said means again sends said command associated with said error and monitors said status signal to determine whether said command associated with said error was properly executed.

18. The videoconferencing system of claim 17 wherein said means provides a first said error detection signal if said command which was sent again was properly executed and provides a second said error detection signal if said command which was sent again was not properly executed.

19. A videoconferencing system with error detection, comprising:

a camera for providing a picture;

peripheral device for performing a specified function in response to a command signal;

a detector for providing a peripheral device status signal in response to detecting said peripheral device performing said specified function;

a monitor for displaying said picture;

means for providing said command to said peripheral device, for monitoring said peripheral device status signal to determine whether said command was properly executed by said peripheral device, for determining that an error has occurred if said command was not properly executed by said peripheral device, and for providing an error detection signal if said error has occurred and for maintaining a record of said error and an indication of the command associated with said error.

20. The videoconferencing system of claim 19 and further comprising a modem for connecting said means to a telephone line and wherein said means provides a notice of said error and said indication of the command associated with said error via said modem to a remote location.

21. The videoconferencing system of claim 20 wherein said means automatically provides said notice of said error and said indication of the command associated with said error upon determining that said error has occurred.

22. The videoconferencing system of claim 20 wherein said means provides said notice of said error and said indication of the command associated with said error in response to said remote location calling into said modem.

23. The videoconferencing system of claim 19 wherein said means, upon determining that said error has occurred, provides a second command to said peripheral device, said second command specifying a function which is reverse to said function specified by said command associated with said error.

24. The videoconferencing system of claim 23 wherein said means monitors said peripheral device status signal to determine whether said second command was properly executed.

25. The videoconferencing system of claim 24 wherein said means provides a first said error detection signal if said second command was properly executed and provides a second said error detection signal if said second command was not properly executed.

26. The videoconferencing system of claim 24 wherein, if said second command was properly executed, said means again sends said command associated with said error to said peripheral device and monitors said peripheral device status signal to determine whether said command associated with said error was properly executed.

27. The videoconferencing system of claim 26 wherein said means provides a first said error detection signal if said command which was sent again was properly executed and provides a second said error detection signal if said command which was sent again was not properly executed.

* * * * *